US011955631B2

United States Patent
Shin et al.

(10) Patent No.: US 11,955,631 B2
(45) Date of Patent: Apr. 9, 2024

(54) COMPOSITE CATHODE ACTIVE MATERIAL, CATHODE AND LITHIUM BATTERY EACH CONTAINING COMPOSITE CATHODE ACTIVE MATERIAL, AND METHOD OF PREPARING COMPOSITE CATHODE ACTIVE MATERIAL

(71) Applicants: SAMSUNG ELECTRONICS CO., LTD., Suwon-si (KR); Samsung SDI Co., Ltd., Yongin-si (KR)

(72) Inventors: Dongwook Shin, Suwon-si (KR); Sukgi Hong, Seongnam-si (KR); Jinhwan Park, Seoul (KR); Byungjin Choi, Seoul (KR)

(73) Assignees: SAMSUNG ELECTRONICS CO., LTD., Gyeonggi-Do (KR); SAMSUNG SDI.CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/358,795

(22) Filed: Mar. 20, 2019

(65) Prior Publication Data

US 2020/0112024 A1 Apr. 9, 2020

(30) Foreign Application Priority Data

Oct. 4, 2018 (KR) .................. 10-2018-0118138

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/44* (2013.01); *H01M 4/0471* (2013.01);
(Continued)

(58) Field of Classification Search
CPC combination set(s) only.
See application file for complete search history.

(56) References Cited

U.S. PATENT DOCUMENTS 7,381,496 B2 6/2008 Onnerud et al.
8,367,247 B2 2/2013 Kim et al.
(Continued)

FOREIGN PATENT DOCUMENTS

CN 101335345 A 12/2008
CN 101884126 A 11/2010
(Continued)

OTHER PUBLICATIONS

"The preparation and role of Li2ZrO3 surface coating LiNi0.5Co0.2Mn0.3O2 as cathode for lithium-ion batteries; Applied Surface Science vol. 361, Jan. 15, 2016, p. 150-156" (Xu) (Year: 2016).*
(Continued)

*Primary Examiner* — Ula C Ruddock
*Assistant Examiner* — Sarika Gupta
(74) *Attorney, Agent, or Firm* — CANTOR COLBURN LLP

(57) ABSTRACT

A composite cathode active material, a cathode and a lithium battery each including the composite cathode active material, and a method of manufacturing the composite cathode active material. The composite cathode active material includes a core including a plurality of primary particles, and a shell disposed on the core, wherein a primary particle of the plurality of primary particles includes a lithium nickel transition metal oxide, the shell includes a first composition and a second composition, wherein the first composition contains a first metal and the second composition contains a second metal, wherein the first metal includes a metal of Groups 2, 4, 5, and 7 to 15, the second metal includes a metal of Group 3, and the first composition includes a first phase
(Continued)

and the second composition includes a second phase that is distinguishable from the first phase.

29 Claims, 11 Drawing Sheets
(3 of 11 Drawing Sheet(s) Filed in Color)

(51) Int. Cl.
*H01M 4/02* (2006.01)
*H01M 4/04* (2006.01)
*H01M 4/131* (2010.01)
*H01M 4/36* (2006.01)
*H01M 4/505* (2010.01)
*H01M 10/0525* (2010.01)

(52) U.S. Cl.
CPC .......... *H01M 4/131* (2013.01); *H01M 4/366* (2013.01); *H01M 4/505* (2013.01); *H01M 10/0525* (2013.01); *C01P 2002/72* (2013.01); *C01P 2002/76* (2013.01); *C01P 2002/90* (2013.01); *C01P 2004/03* (2013.01); *C01P 2004/04* (2013.01); *C01P 2006/40* (2013.01); *H01M 2004/021* (2013.01); *H01M 2004/028* (2013.01)

(56) References Cited

U.S. PATENT DOCUMENTS

| | | | |
|---|---|---|---|
| 9,941,508 | B2 | 4/2018 | Lee et al. |
| 9,960,418 | B2 | 5/2018 | Kwak et al. |
| 9,972,841 | B2 | 5/2018 | Kwak et al. |
| 10,938,030 | B2 | 3/2021 | Shin et al. |
| 11,011,746 | B2 | 5/2021 | Park et al. |
| 11,165,061 | B2 | 11/2021 | Choi et al. |
| 2008/0311432 | A1 | 12/2008 | Park et al. |
| 2008/0318131 | A1 | 12/2008 | Watanabe et al. |
| 2010/0203388 | A1 | 8/2010 | Kim et al. |
| 2011/0171530 | A1* | 7/2011 | Esaki ............... H01M 4/505 252/182.1 |
| 2013/0295450 | A1* | 11/2013 | Kakeya ............. H01M 4/382 429/206 |
| 2014/0045067 | A1* | 2/2014 | Cho ............... C01G 45/1235 429/231.95 |
| 2014/0197357 | A1 | 7/2014 | Ofer et al. |
| 2015/0171423 | A1 | 6/2015 | Kim et al. |
| 2015/0228975 | A1* | 8/2015 | Lee ............... H01M 4/366 429/188 |
| 2015/0380728 | A1* | 12/2015 | Son ............... H01J 1/304 252/502 |
| 2016/0118648 | A1 | 4/2016 | Gunji et al. |
| 2016/0204424 | A1* | 7/2016 | Sawai ............. H01M 4/1391 429/221 |
| 2017/0018767 | A1* | 1/2017 | Park ............... H01M 10/0569 |
| 2017/0207443 | A1* | 7/2017 | Shen ............... H01M 4/366 |
| 2017/0338471 | A1* | 11/2017 | Zheng ............. H01M 4/5825 |
| 2018/0248179 | A1 | 8/2018 | Wang et al. |
| 2020/0136126 | A1 | 4/2020 | Hong et al. |
| 2020/0136132 | A1 | 4/2020 | Hong et al. |

FOREIGN PATENT DOCUMENTS

| | | |
|---|---|---|
| CN | 106356507 A | 1/2017 |
| CN | 108288692 A | 7/2018 |
| JP | 2006114256 A | 4/2006 |
| JP | 2008500259 A | 1/2008 |
| JP | 2011159421 A | 8/2011 |
| JP | 2013206679 A | 10/2013 |
| JP | 2015065007 A | 4/2015 |
| JP | 5743185 B2 | 7/2015 |
| JP | 2016506032 A | 2/2016 |
| JP | 2016081903 A | 5/2016 |
| JP | 2017007918 A | 1/2017 |
| JP | 2017526117 A | 9/2017 |
| KR | 20100052116 A | 5/2010 |
| KR | 20120121235 A | 11/2012 |
| KR | 1328986 B1 | 11/2013 |
| KR | 20150037635 A | 4/2015 |
| KR | 20150070853 A | 6/2015 |
| KR | 1615413 B1 | 4/2016 |
| KR | 20160094063 A | 8/2016 |
| KR | 1665754 B1 | 10/2016 |
| KR | 20170008164 A | 1/2017 |
| KR | 20170112850 A | 10/2017 |
| KR | 20180038485 A | 4/2018 |
| KR | 20180063861 A | 6/2018 |
| WO | 2017164718 A1 | 9/2017 |

OTHER PUBLICATIONS

Yan Xu et al., "The enhanced high cut-off voltage electrochemical performances of LiNi0.5Co0.2Mn0.3O2 by the CeO2 modification", Electrochimica Acta, Sep. 28, 2016, pp. 49-60, vol. 219.
Extended European search report issued by the European Patent Office dated Feb. 14, 2020 in the examination of the European Patent Application No. 19186705.0, which corresponds to above U.S. Application.
Xiaodong Zhang et al: "Enhanced electrochemical performance of perovskite LaNiO3 . . . ", vol. 283, Jul. 17, 2018, pp. 1203-1212, XP055591305.
EP Office Action dated Aug. 23, 2022 of EP Patent Application No. 19186705.0.
KR Office Action dated Jul. 20, 2023 of KR Patent Application No. 10-2018-0118138.
JP Office Action issued date Oct. 10, 2023 of JP Patent Application No. 2019-175697.
Office Action issued on Dec. 1, 2023 of CN Patent Application No. 201910864597.7.

* cited by examiner

COMPOSITE CATHODE ACTIVE MATERIAL, CATHODE AND LITHIUM BATTERY EACH CONTAINING COMPOSITE CATHODE ACTIVE MATERIAL, AND METHOD OF PREPARING COMPOSITE CATHODE ACTIVE MATERIAL

CROSS-REFERENCE TO RELATED APPLICATION

This application claims priority to and the benefit of Korean Patent Application No. 10-2018-0118138, filed on Oct. 4, 2018, in the Korean Intellectual Property Office, and all the benefits accruing therefrom under 35 U.S.C. § 119, the content of which is incorporated herein in its entirety by reference.

BACKGROUND

1. Field

The present disclosure relates to a composite cathode active material, a cathode and a lithium battery each including the same, and a method of preparing the composite cathode active material.

2. Description of the Related Art

For the miniaturization and high performance of various devices, it is important for lithium batteries to have high energy density in addition to a reduced size and weight. That is, high-capacity lithium batteries are desirable.

High-capacity cathode active materials may be used to provide lithium batteries having high capacity.

Nickel-based cathode active materials may have poor lifetime characteristics and poor thermal stability due to high amounts of residual lithium on their surfaces and side reactions resulting from cationic mixing.

Therefore, there is a need for a method that can prevent deterioration of battery performance even when a nickel-based cathode active material is used.

SUMMARY

Provided is a composite cathode active material that is capable of preventing deterioration of battery performance due to suppression of a side reaction of the composite cathode active material.

Provided is a cathode including the composite cathode active material.

Provided is a lithium battery including the cathode.

Provided are methods of preparing the composite cathode active material.

Additional aspects will be set forth in part in the description which follows and, in part, will be apparent from the description, or may be learned by practice of the presented embodiment.

According to an aspect of an embodiment, a composite cathode active material includes
a core including a plurality of primary particles; and
a shell disposed on the core,
wherein
a primary particle of the plurality of primary particles includes a lithium nickel transition metal oxide, and
the shell includes a first composition and a second composition, wherein the first composition contains a first metal and the second composition contains a second metal, wherein the first metal includes nickel and a metal of Groups 2, 4, 5, and 7 to 15 of the Periodic Table of Elements,
the second metal includes a metal of Group 3 of the Periodic Table of Elements, and
the first composition includes a first phase and the second composition includes a second phase that is distinguishable from the first phase.

According to an aspect of an embodiment, a cathode includes the composite cathode active material.

According to an aspect of an embodiment, a lithium battery includes the cathode.

According to an aspect of an embodiment, a method of preparing a composite cathode active material includes:
providing a lithium nickel transition metal oxide;
contacting a first metal precursor a second metal precursor, and the lithium nickel transition metal oxide to prepare a mixture;
drying the mixture; and
heat-treating the dried mixture in an oxidizing atmosphere at a temperature of 400° C. to 1000° C. to manufacture the composite cathode active material.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of the embodiments, taken in conjunction with the accompanying drawings in which.

DETAILED DESCRIPTION

Figure 1A:
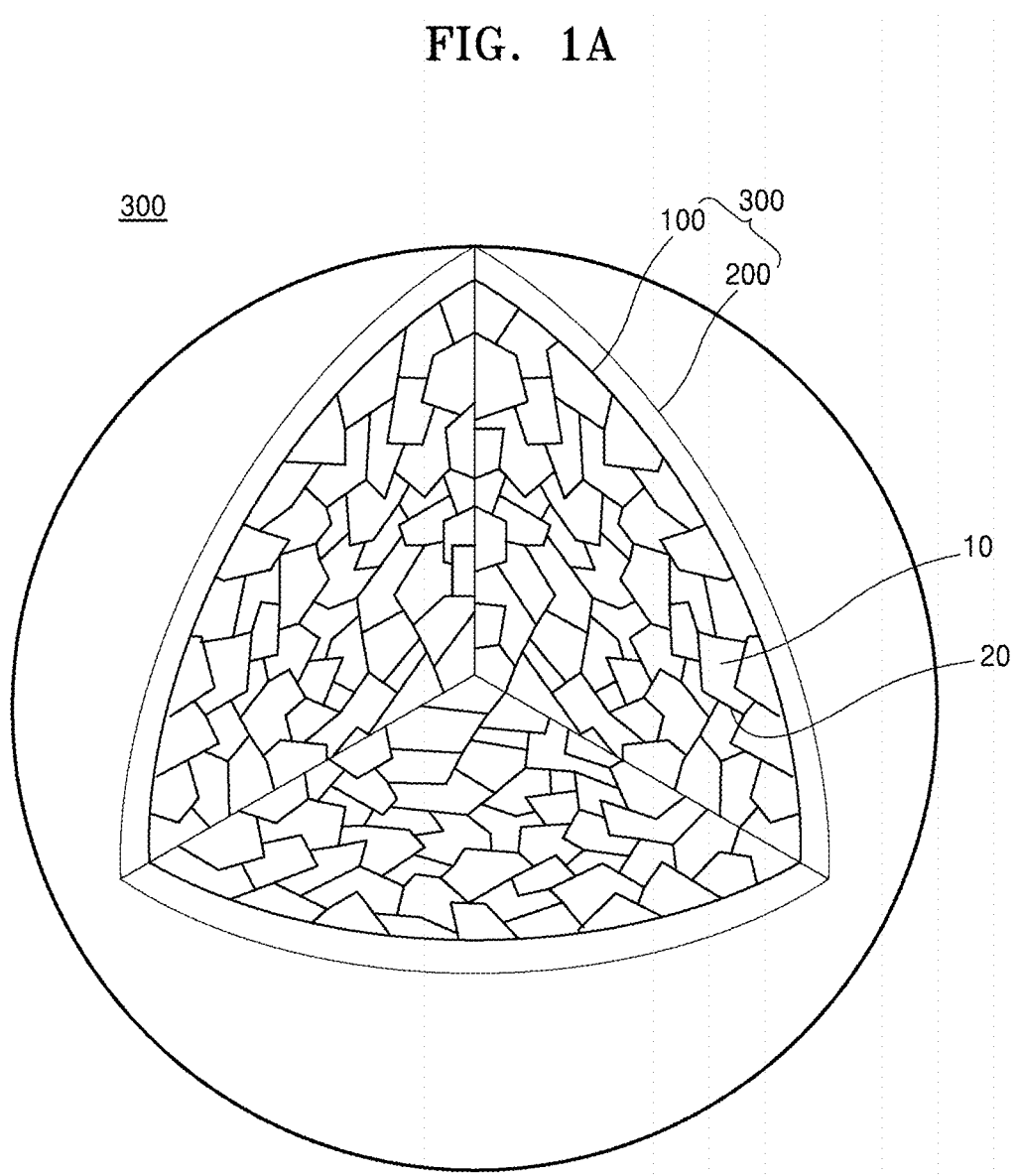
FIG. 1A shows a schematic diagram illustrating a partial view of an embodiment of the internal structure of a composite cathode active material.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The disclosed embodiment may have various variations. Accordingly, examples of are illustrated in drawings and will be described in detail. It is to be understood, however, that this is not intended to limit the disclosure to any particular embodiment, but is intended to encompass all conversions, equivalents, or alternatives falling within the scope of this disclosure.

The terminology used herein is for the purpose of describing particular examples only and is not intended to be limiting. The singular forms "a," "an," and "the" include plural referents unless the context clearly dictates otherwise. Hereinafter, it is to be understood that the terms such as "including," "having," and "comprising" used herein are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. The expression "/" may be interpreted as "and" or "or" according to the context.

In the drawings, the thickness may be enlarged or reduced in order to clearly represent layers and regions. Like elements are denoted by like reference numerals throughout the specification. It will be understood that when a layer, a film, a region, or a panel is referred to as being "formed on" another layer, film, region, or panel, it can be directly or indirectly formed on the other layer, film, region, or panel. Throughout the specification, the terms of the first, the second, etc. may be used to describe various components, but the components should not be limited by these terms. These components are only used to distinguish one component from another.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C-rate is a measure of the rate at which a battery is discharged relative to its maximum capacity. A 1.0 C rate means a discharge current which will discharge the entire battery in one hour, e.g., a 1.0 C rate for a battery having a discharge capacity of 1.6 ampere-hours would be a discharge current of 1.6 amperes. For example, a 5.0 C rate for this battery would be 8.0 amperes. For example, a 0.5 C rate for this battery would be 0.8 amperes.

Hereinafter, a composite cathode active material, a cathode including the composite cathode active material, a lithium battery including the composite cathode active material, and a method of preparing the composite cathode active material will be described in detail.

A composite cathode active material according to an embodiment includes a core including a plurality of primary particles; and a shell disposed on the core, wherein a primary particle of the plurality of the primary particles comprises a lithium nickel transition metal oxide, and the shell includes a first composition containing a first metal and a second composition containing a second metal, and the first metal includes, nickel and a metal of Group 2, Group 4, Group 5, or Group 7 to Group 15 of the Periodic Table of Elements, and the second metal includes a metal of Group 3 of the Periodic Table of the Elements, and the first composition includes a first phase and the second composition includes a second phase that is distinguishable from the first phase.

Referring to FIG. 1A, a composite cathode active material 300 includes a core 100 including a plurality of primary particles 10, and a shell 200 located on the core 100. The core 100 is a secondary particle containing the primary particles 10. The primary particles 10 may be, for example, crystallites having an identical crystal structure. The primary particles 10 include a lithium nickel transition metal oxide, and the shell 200 may include a first composition including a first metal and a second composition including a second metal. The first metal may include nickel and a metal of Group 2, Group 4, Group 5, or Group 7 to Group 15 of the Periodic Table of Elements, The second metal may include a metal of Group 3 of the Periodic Table of the Elements. The first composition may include a first phase and the second composition includes a second phase that is distinguishable from the first phase. The lithium nickel transition metal oxide may have a layered crystal structure.

Hereinafter, an embodiment will be further disclosed and the theoretical basis that supports a composite cathode active material according to an embodiment provides excellent effects. However, this description is provided only to help understanding of the present disclosure, and in view of any aspects, shall not limit the scope of the present disclosure.

The shell 200 including the first composition containing the first metal is disposed on the core 100 of the composite cathode active material 300, for example, to suppress the leakage of nickel ions from the core 100 into an electrolytic solution. Due to a heat-treatment included in a process for production of a shell including the first composition, the suppression of the leakage, e.g., dilution or elution, of nickel ions from the core 100 to the electrolytic solution may be decreased. Since the second composition including the second metal is additionally included, for example, the leakage of the electrolytic solution from the core 100 into the electrolytic solution may be effectively suppressed. When the shell 200 including the first composition and the second composition is formed, a precursor of the first composition and a precursor of the second composition may react with a lithium compound (e.g., $Li_2CO_3$, or LiOH) remaining on the core 100 to reduce the amount of a lithium compound remaining on the surface of the composite cathode active material 300. Therefore, and while not wanting to be bound by theory, it is understood that side reactions occurring between the composite cathode active material 300 and the electrolytic solution and gas generation are effectively suppressed. The first composition may include a first phase and the second composition includes a second phase that is distinguishable from the first phase. In an embodiment, the first phase is different from the second phase in terms of a crystal structure. Since the second composition includes the second phase that is distinguishable from the first phase and has improved structural and thermal stability, the side reaction between the composite cathode active material 300 and the electrolytic solution are suppressed, leading to a stabilization of the surface of the composite cathode active material 300. The second phase included in the second composition may have improved ionic conductivity and electronic conductivity. Accordingly, the interfacial resistance between the composite cathode active material and the electrolytic solution is reduced. Accordingly, and although the shell 200 includes the second composition, the internal resistance of a lithium battery including the composite cathode active material 300 may be maintained or reduced. As a result, the cycle characteristics and thermal stability of the lithium battery including the composite cathode active material 300 are improved.

In the composite cathode active material 300, the amount of nickel in transition metal included in the lithium nickel transition metal oxide may be about 70 mole percent (mol %) or greater, about 71 mol % or greater, about 75 mol % or greater, about 80 mol % or greater, about 85 mol % or greater, about 90 mol % or greater, about 93 mol % or greater, about 95 mol % or greater, or about 97 mol % or greater. In the composite cathode active material 300, the amount of nickel in the lithium nickel transition metal oxide may be about 99.9 mol % or less, 99 mol % or less, or 98 mol % or less, e.g., about 70 mol % to about 99 mol %, or about 75 mol % to about 95 mol %. Since the amount of nickel in the lithium nickel transition metal oxide is about 70 mol % or greater, high capacity may be provided. Accordingly, a lithium battery providing high capacity may be provided.

The first composition may have, for example, a phase having a layered crystal structure, a phase having a spinel crystal structure, or a combination thereof. The first composition may have, for example, a layered crystal structure, and may belong to a space group R-3m. The first composition may have, for example, a spinel crystal structure, and may belong to a space group Fd-3m. Since the first composition has such phases, the cycle characteristics and thermal stability of a lithium battery are further improved.

The second composition may have, for example, a phase having a fluorite crystal structure. The second composition may have, for example, a fluorite crystal structure belonging to an Fm-3m space group. Since the second composition has such a phase, the cycle characteristics and thermal stability of a lithium battery are further improved.

The shell may have, for example, a multi-layered structure including a first layer including the first composition and a second layer including the second composition, a single-layered structure including the first composition and the second composition, or a combination thereof.

When the shell has a multi-layered structure, the first layer including the first composition may be disposed on the core of a secondary particle and primary particles that constitute the core, and the second layer including the second composition is disposed on the first layer. Since the composite cathode active material has a shell that has a multi-layered structure, the cycle characteristics and thermal stability of a lithium battery including such a composite cathode active material are improved.

Figure 4A:
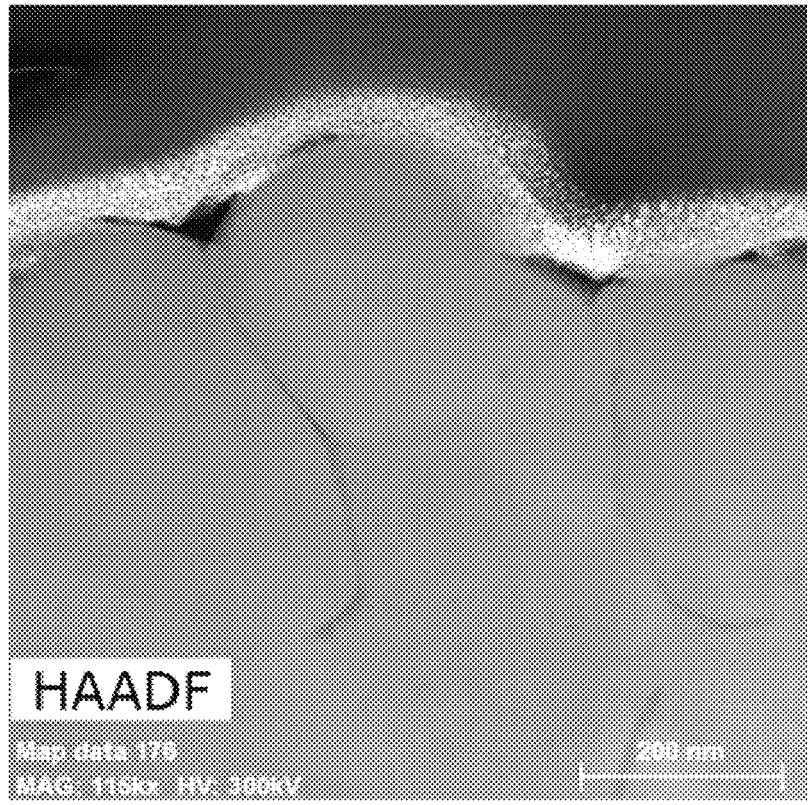
FIGS. 4A to 4C show a high-angle annular dark field ("HAADF") scanning transmission electron microscope ("STEM") image and energy dispersive X-ray spectroscopy ("EDS") images of the cross-section of the composite cathode active material of Example 1.
Figure 4B:
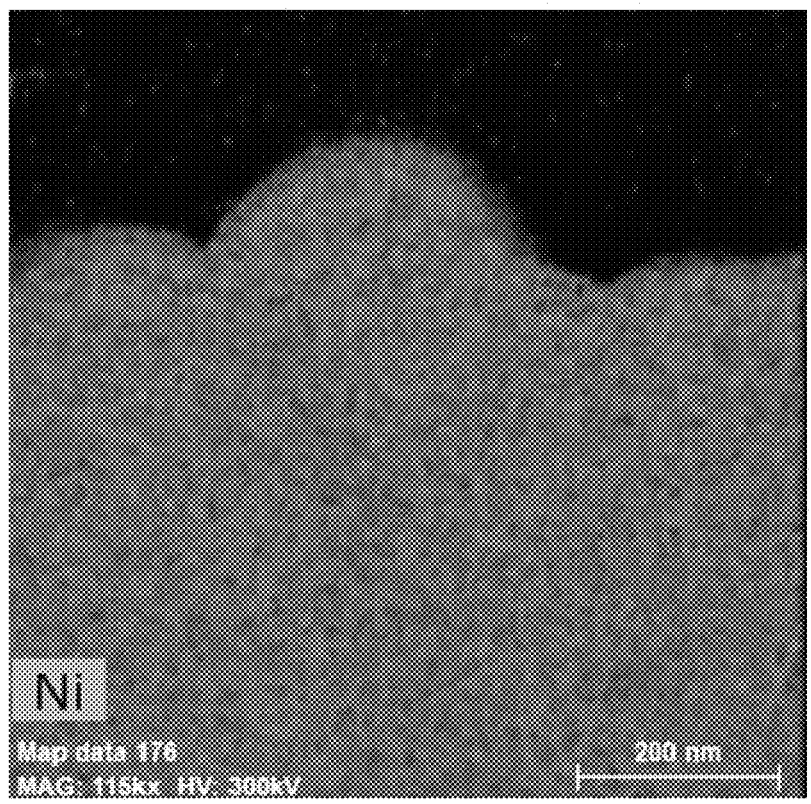
Figure 4C:
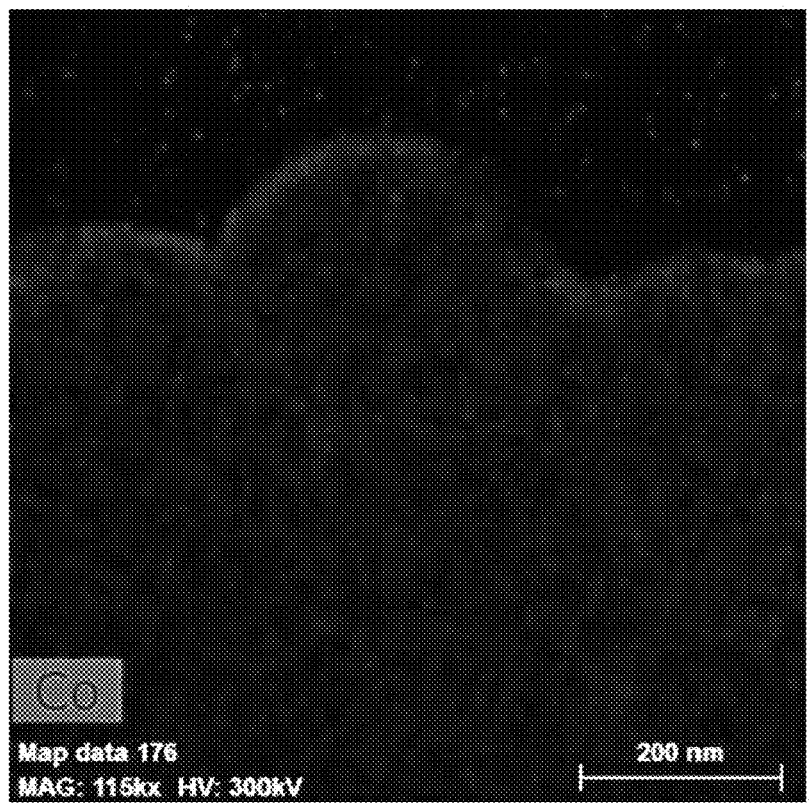

In an embodiment, the first layer is disposed on primary particles constituting the core, and the concentration of the first metal contained in the first layer is greater than the concentration of the first metal contained in the primary particles. Referring to FIG. 4C, the first layer is located on primary particles constituting the core, and the concentration of Co contained in the first layer is greater than the concentration of Co contained in the primary particles. In FIGS. 4B and 4C, the greater the concentration, the brighter the color. For example, the concentration per unit area of the first metal contained in the first layer is greater than the concentration per unit area of the first metal contained in the primary particles.

In the composite cathode active material, for example, the thicknesses of the first layer and the second layer included in a shell having a multi-layer structure are equal to or different from each other. For example, when the second layer is thicker than the first layer, the leakage of the metal ions and the side reaction between the composite cathode active material and the electrolytic solution are more effectively suppressed. For example, when the second layer is thinner than the first layer, the increase in resistance of the composite cathode active material due to the second layer is minimized, while the side reaction between the composite cathode active material and the electrolytic solution is suppressed. Accordingly, although the second layer being thicker than the first layer is added, the cycle characteristics of lithium batteries including composite cathode active material are improved.

The thickness of the first layer and/or the second layer is, each independently, and for example, 50 nanometers (nm) or less, 40 nm or less, 30 nm or less, 20 nm or less, 10 nm or less, or 5 nm or less. The thickness of the first layer and/or the second layer is, each independently, and for example, in the range of about 1 nm to about 50 nm, about 1 nm to about 40 nm, about 1 nm to about 30 nm, about 1 nm to about 20 nm, about 1 nm to about 10 nm, or about 1 nm to about 5 nm. Since the thicknesses of the first layer and/or the second layer are within these ranges, the cyclic characteristics and thermal stability of lithium batteries may be further improved. In an embodiment, the thickness of the second layer may be, for example, 500 nm or less, 400 nm or less, 300 nm or less, 200 nm or less, 100 nm or less, or 50 nm or less. In an embodiment, the thickness of the second layer may be, for example, in the range of about 10 nm to about 500 nm, about 10 nm to about 400 nm, about 10 nm to about 300 nm, about 10 nm to about 200 nm, about 10 nm to about 100 nm, or about 10 nm to about 50 nm. Since the thicknesses of the second layer are within these ranges, the cyclic characteristics and thermal stability of lithium batteries may be further improved.

In an embodiment, the shell may have a mono-layered (e.g., single-layered) structure. Since the shell has a mono-layered structure, a third layer including the first composition and the second composition at the same time may be disposed on the core, which is a secondary particle, and primary particles constituting the core. Since the composite cathode active material has a shell that has a mono-layered structure, the cycle characteristics and thermal stability of a lithium battery including such a composite cathode active material are improved.

The thickness of the shell including the first layer and the second layer or the third layer in the composite cathode active material may be, for example, 550 nm or less, 450 nm or less, 350 nm or less, 250 nm or less, 150 nm or less, or 50 nm or less. The thickness of the shell may be, for example, in the range of about 1 nm to about 550 nm, about 1 nm to about 450 nm, about 1 nm to about 350 nm, about 1 nm to about 250 nm, about 10 nm to about 150 nm, or about 10 nm to about 50 nm. Since the thickness of the shell is within these ranges, the cyclic characteristics and thermal stability of lithium batteries may be further improved.

In the composite cathode active material, the shell entirely or partially covers the surface of the core. In an embodiment, the shell covers 10% or greater, 20% or greater, 30% or greater, 40% or greater, or 50% or greater of the core. In an embodiment, the shell covers 99.9% or less, 99% or less, 95% or less, 90% or less of the core. The shell located on the core may be discontinuous, that is, the shape of an island, or may be continuous. Referring to FIGS. 4A through 4C, the shell is disposed, for example, on at least two primary particles exposed on the surface of the core. In an embodiment, the shell covers an entirety of the core.

In an embodiment, the first composition included in the shell may be disposed on primary particles that constitute the core and/or a secondary particle that corresponds to the core.

In an embodiment, the first metal contained in the first composition may be Co, Mg, Zr, Al, Mn, Si, Pd, Ti, Sn, Ir, Pt, Ru, Ca, Ba, V, Nb, Fe, Cu, Ag, Zn, B, Ga, Ge, Sb, Bi, or a combination thereof. Since the first composition includes the first metal, the cycle characteristics and thermal stability of a lithium battery including the composite cathode active material are improved. Since the first layer includes, for example, Co that provides discharge capacities, a decrease in the capacity of the composite cathode active material is prevented. When the first layer includes, for example, Mg, the structural stability of the composite cathode active material is improved, and thus, lifetime characteristics of a lithium battery including the composite cathode active material may be improved.

The first composition of the composite cathode active material may be, for example, a composition including the first metal and oxygen or a composition including lithium, the first metal, and oxygen. The first composition may include, for example, about 0 mole to about 3.3 moles of lithium, based on 1 mole of the first composition, about 0.7 moles to about 3.3 moles of the first metal, based on 1 mole of the first composition, and about 1.7 moles to about 4.3 moles of oxygen, based on 1 mole of the first composition. The first composition may include, for example, about 0 mole to about 3.2 moles of lithium, based on 1 mole of the first composition, about 0.8 moles to about 3.2 moles of the first metal, based on 1 mole of the first composition, and about 1.8 moles to about 4.2 moles of oxygen, based on 1 mole of the first composition. The first composition may include, for example, about 0 mole to about 3.1 moles of lithium, based on 1 mole of the first composition, about 0.9 moles to about 3.1 moles of the first metal, based on 1 mole of the first composition, and about 1.9 moles to about 4.1 moles of oxygen, based on 1 mole of the first composition. Since the first composition has these ratios of composition, the cycle characteristics and thermal stability of a lithium battery including the composite cathode active material are improved.

The first composition has, for example, a composition represented by the following Formula 1:

$$Li_aM1_bO_c$$ Formula 1 wherein, in Formula 1, M1 is Co, Mg, Zr, Al, Mn, Si, Pd, Ti, Sn, Ir, Pt, Ru, Ca, Ba, V, Nb, Fe, Cu, Ag, Zn, B, Ga, Ge, Sb, Bi, or a combination thereof, and satisfies the conditions of $0 \le a \le 3.1$, $0.9 \le b \le 3.1$, and $1.9 \le c \le 4.1$.

The first composition may include, for example, $Co_3O_4$, MgO, $Li_xCoO_2$ ($0<x\le1.5$), $Li_2ZrO_3$, $ZrO_2$, $Al_2O_3$, $Li_2MnO_3$, $LiMn_2O_4$, $LiAlO_2$, $TiO_2$, $Li_2TiO_3$, $Li_2SnO_3$, SnO, $SnO_2$, $BaTiO_3$, $V_2O_5$, $Nb_2O_5$, ZnO, $B_2O_3$, $Ga_2O_3$, or a combination thereof.

In the composite cathode active material, the amount of the first composition or the first metal included in the first layer or the third layer may be, for example, based on 100 parts by weight of the lithium nickel transition metal oxide, 10 parts by weight or less, 5 parts by weight or less, 4 parts by weight or less, 3 parts by weight or less, 2 parts by weight or less, or 1 parts by weight or less. The amount of the first composition or the first metal included in the first layer or the third layer may be, for example, based on 100 parts by weight of the lithium nickel transition metal oxide, about 0.01 parts by weight to about 10 parts by weight, about 0.05 parts by weight to about 5 parts by weight, about 0.1 parts by weight to about 4 parts by weights, about 0.1 parts by weight to about 3 parts by weights, about 0.1 parts by weight to about 2 parts by weight, or about 0.1 parts by weight to about 1 part by weight. Since the first layer or the third layer has such ranges of the first composition or first metal, the cycle characteristics and thermal stability of a lithium battery including the composite cathode active material are improved.

The second composition in the composite cathode active material may be, for example, a composition including the second metal and oxygen. The second composition may include, for example, about 0.7 moles to about 1.3 moles of the second metal, based on 1 mole of the second composition, and about 1.7 moles to about 2.3 moles of oxygen, based on 1 mole of the second composition. The second composition may include, for example, about 0.8 moles to about 1.2 moles of the second metal, based on 1 mole of the second composition, and about 1.8 moles to about 2.2 moles of oxygen, based on 1 mole of the second composition. The second composition may include, for example, about 0.9 moles to about 1.1 moles of the second metal, based on 1 mole of the second composition, and about 1.9 moles to about 2.1 moles of oxygen, based on 1 mole of the second composition. Since the second composition has these ratios of composition, the cycle characteristics and thermal stability of a lithium battery including the composite cathode active material are improved.

The second composition has, for example, a composition represented by the following Formula 2:

$$M2_bO_c$$ Formula 2 wherein in Formula 2, M2 is Ce, La, Sc, Y, Nd, Sm, Er, or a combination thereof, and satisfies the conditions of $0.9 \le b \le 1.1$ and $1.9 \le c \le 2.1$.

The second composition may include, for example, $CeO_2$, $Ce_2O_3$, $Ce_3O_4$, $La_2O_3$, $Sc_2O_3$, $Y_2O_3$, $Nd_2O_3$, $Sm_2O_3$, $Er_2O$, or a combination thereof.

In the composite cathode active material, the amount of the second composition or the second metal included in the second layer or the third layer may each independently be, for example, based on 100 parts by weight of the lithium nickel transition metal oxide, 10 parts by weight or less, 5 parts by weight or less, 4 parts by weight or less, 3 parts by weight or less, 2 parts by weight or less, or 1.5 parts by weight or less. The amount of the second composition or the second metal included in the second layer or the third layer may each independently be, for example, based on 100 parts by weight of the lithium nickel transition metal oxide, about 0.01 parts by weight to about 10 parts by weight, about 0.05 parts by weight to about 5 parts by weight, about 0.1 parts by weight to about 4 parts by weights, about 0.1 parts by weight to about 3 parts by weights, about 0.1 parts by weight to about 2 parts by weight, or about 0.1 parts by weight to about 1.5 parts by weight. Since the second layer or the third layer has such ranges of the second composition or second metal, the cycle characteristics and thermal stability of a lithium battery including the composite cathode active material are improved.

In an embodiment, the second composition may be disposed on primary particles that constitute the core and/or a secondary particle that corresponds to the core. For example, the second composition may be disposed on the first layer, the core, or a combination thereof.

Figure 1B:
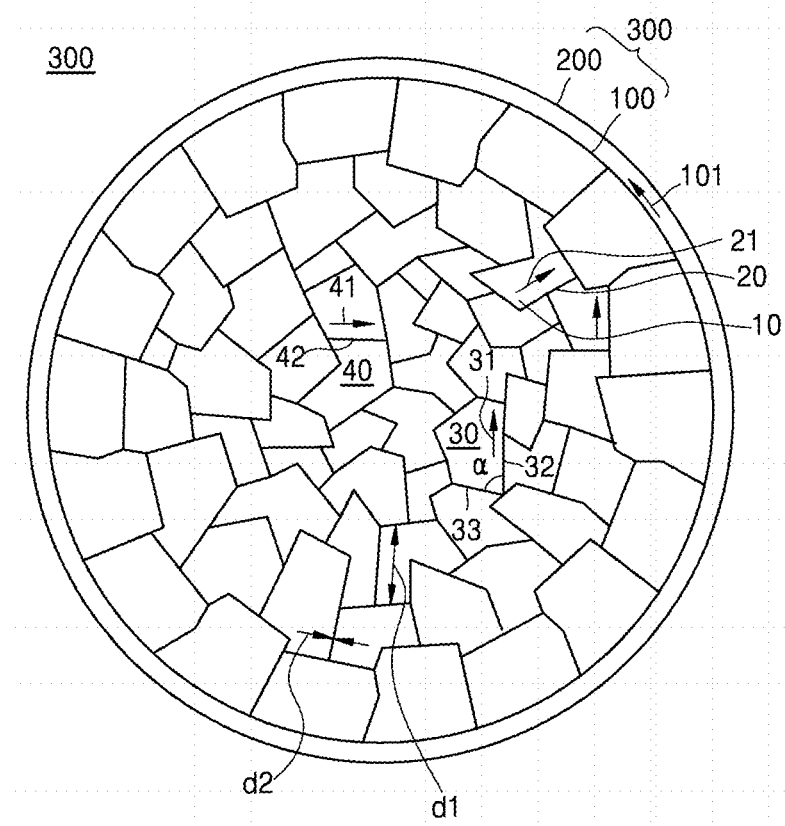
FIG. 1B shows a schematic cross-sectional view of an embodiment of a composite cathode active material.

Referring to FIGS. 1A and 1B, in the composite cathode active material 300, the core 100 includes a grain boundary 20 located between primary particles 10 while being adjacent to the primary particles 10, wherein the grain boundary 20 includes a third composition containing a third metal. Since the grain boundary 20 adjacent to the primary particles 10 between the primary particles 10 constituting the core 100 of the composite cathode active material 300 includes the third composition, lithium ions conduct smoothly inside the core 100, e.g., with reduced concentration polarization, and the leakage or elution of nickel ions from the primary particles 10 in the core 100 into the electrolytic solution, which may permeate into the core 100, may be suppressed. Also, the side reaction between the primary particles 10 and the electrolytic solution in the core 100 are suppressed. Accordingly, the cycle characteristics of the lithium battery including the composite cathode active material 300 are improved. Also, the amount of lithium remaining on the surfaces of the primary particles 10 located inside the core 100 is reduced, and thus the deterioration of the composite cathode active material 300 is suppressed and less gas is generated, leading to an increase in the thermal stability of a lithium battery. While not wanting to be bound by theory, it is understood that the third composition of the grain boundary 20, being between the primary particles 10 and adjacent to the primary particles 10, prevents the surface damage of the primary particles 10 occurring during the washing process of the composite cathode active material 300 and prevents the decrease in the lifetime characteristics of the lithium battery. The third composition of the grain boundary 20, being between the primary particles 10 and adjacent to the primary particles 10, buffers a volumetric change in the primary particles 10 during to the charging and discharging cycle, leading to suppression of cracks among the primary particles 10, and even after the long-term charging and discharging, suppression of a decrease in mechanical strength of the composite cathode active material 300, and preventing the deterioration of a lithium battery. Also, since the third composition in the lithium nickel transition metal oxide included in the primary particles 10 includes the third metal, the crystal structure of lithium nickel transition metal oxide is stabilized and thus, the cyclic characteristics of a lithium battery including the composite cathode active material are further improved.

The third composition included in the grain boundary 20 may have a third phase, for example, a phase distinct from the phase contained in the primary particles. The third phase has, for example, a monoclinic crystal structure. Since the third composition has a monoclinic crystal structure, lithium ions may move two-dimensionally in the grain boundary 20 including the third composition, and thus lithium ions conduct easily in the core 100, e.g., with reduced concentration polarization, leading to improvement in the cyclic characteristics of a lithium battery. The third composition may have, for example, a monoclinic crystal structure belonging to a C2/m, C12/c1, or C2/c space group. Since the third composition has the monoclinic crystal structure belonging to a C2/m, C12/c1, or C2/c space group, the cycle characteristics and thermal stability of a lithium battery including the composite cathode active material are improved.

The third metal included in the third composition may be, for example, Zr, Al, Co, Mg, Mn, Si, Mo, Pd, Ti, Sn, Ir, Pt, or Ru. Since the third composition includes the third metal, the charging and discharging characteristics of a lithium battery including a composite cathode active material are improved.

In the composite cathode active material, the third composition may include lithium, the third metal, and oxygen. The third composition may include, for example, about 1.7 moles to about 2.3 moles of lithium, based on 1 mole of the third composition, about 0.7 moles to about 1.3 moles of the third metal, based on 1 mole of the third composition, and about 2.7 to about 3.3 moles of oxygen, based on 1 mole of the third composition. The third composition may include, for example, about 1.8 moles to about 2.2 moles of lithium, based on 1 mole of the third composition, about 0.8 moles to about 1.2 moles of the third metal, based on 1 mole of the third composition, and about 2.8 to about 3.2 moles of oxygen, based on 1 mole of the third composition. The third composition may include, for example, about 1.9 moles to about 2.1 moles of lithium, based on 1 mole of the third composition, about 0.9 moles to about 1.1 moles of the third metal, based on 1 mole of the third composition, and about 2.9 to about 3.1 moles of oxygen, based on 1 mole of the third composition.

The third composition has, for example, a composition represented by the following Formula 3:

$$Li_aM3_bO_c \qquad \text{Formula 3}$$

wherein in Formula 3,

The third composition has, for example, a composition represented by the following Formula 3:

$$Li_aM3_bO_c \qquad \text{Formula 3}$$

wherein in Formula 3,

M3 is Zr, Al, Co, Mg, Mn, Si, Mo, Pd, Ti, Sn, Ir, Pt, Ru, or a combination thereof, and satisfies the conditions of $1.9 \leq a \leq 2.1$, $0.9 \leq b \leq 1.1$, and $2.9 \leq c \leq 3.1$.

Referring to FIG. 1B, the grain boundary 20 in the core 100 of the composite cathode active material 300 may have, for example, a substantially linear shape, due to the substantially rectilinear shape of the primary particles. Since the primary particles 10 adjacent to the grain boundary 20 have a polyhedral shape due to the inclusion of a nickel lithium transition metal oxide having a layered crystal structure, the grain boundary 20 of adjacent primary particles may have a linear or rectilinear shape. In an embodiment, the grain boundary 20 may have, for example, a substantially curved or curvilinear shape. The radius of curvature of the curve may be, for example, greater than 0 and equal to or less than 1 meter (m).

Referring to FIG. 1B, the grain boundary 20 of the composite cathode active material 300 may be disposed, for example, in a direction 21 that is parallel to a surface of an adjacent primary particle. In an embodiment, the direction in which the grain boundary 20 is disposed may be different from a tangential direction 101 of the surface of a portion of the core 100 being closest to the grain boundary 20.

Referring to FIG. 1B, the core 100 of the composite cathode active material 300 includes a first grain boundary 32 and a second grain boundary 33, the first grain boundary 32 and the second grain boundary 33 are disposed directly on a primary particle 30, and the first grain boundary 32 and the second grain boundary 33 cross at an angle α determined by the shape of the primary particle 30. The angle α at which the first grain boundary 32 and the second grain boundary 33 cross may be, for example, greater than 0° to less than about 180°, about 10° to about 170°, about 20° to about 160°, about 30° to about 150°, about 40° to about 140°, about 50° to about 130°, about 60° to about 120°, about 70° to about 110°, or about 80° to about 110°.

Referring to FIG. 1B, the core 100 of the composite cathode active material 300 may include first and second grain boundaries 32 and 42, respectively, adjacent to primary particles 30 and 40. The first and second grain boundaries 32 and 42 may be respectively disposed in directions 31 and 41, which are parallel to the surfaces of the primary particles 30 and 40 adjacent thereto. The directions 31 and 41 of the first and second grain boundaries 32 and 42 are different from each other.

Referring to FIG. 1B, the core 100 of the composite cathode active material 300 has an average grain boundary length of about 50 nm to about 1000 nm and an average grain boundary thickness of about 1 nm to about 200 nm. The length direction of the grain boundary is a direction that is parallel to the surface of the primary particles 20, 30, and 40 adjacent thereto, and the thickness direction of the grain boundary is a direction that is perpendicular to the surface of the primary particles 20, 30, and 40 adjacent thereto. An average grain boundary length may be, for example, in the range of about 50 nm to about 950 nm, about 100 nm to about 900 nm, about 150 nm to about 800 nm, or about 200 nm to about 700 nm. An average grain boundary thickness may be in the range of about 2 nm to about 100 nm, about 5 nm to about 100 nm, about 10 nm to about 100 nm, or about 20 nm to about 100 nm. Within these ranges of the average grain boundary length and the average grain boundary thickness, the lithium battery including the composite cathode active material may provide improved cyclic characteristics and thermal stability. The average grain boundary length is an average value of lengths d1 of grain boundaries arranged in a first direction. The average grain boundary thickness is an average value of thicknesses d2 of grain boundaries arranged in a second direction.

The average particle diameter of primary particles of the composite cathode active material may be, for example, in the range of about 50 nm to about 500 nm, about 50 nm to about 450 nm, about 50 nm to about 400 nm, about 50 nm to about 350 nm, about 50 nm to about 300 nm, about 50 nm to about 250 nm, or about 50 nm to about 200 nm, but is not limited thereto. The average particle diameter of primary particles of the composite cathode active material may be adjusted so long as cyclic characteristics and thermal stability are provided.

The average particle diameter of the core, which is a secondary particle in which primary particles aggregate, of the composite cathode active material may be, for example, about 1 micrometer (μm) to about 30 μm, about 2 μm to about 28 μm, about 4 μm to about 26 μm, about 6 μm to about 24 μm, about 8 μm to about 22 μm, about 10 μm to about 20 μm, about 12 μm to about 18 μm, about 12 μm to about 16 μm, or about 13 μm to about 15 μm, but is not limited thereto. The average particle diameter of the core may be adjusted as long as cyclic characteristics and thermal stability are provided.

In an embodiment, the composite cathode active material may further include the third composition in which the shell includes the third metal. The third composition may be in the shell on the surface of the core, in addition to in the grain boundary in the core. The third composition of the shell has the same composition and the same crystal structure as the third composition in, for example, the grain boundary in the core. The third composition included in the shell may have, for example, a monoclinic crystal structure belonging to a C2/m space group, a C12/c1 space group, or a C2/c space group. The third composition included in the shell may have, for example, the composition represented by the following Formula 3.

In an embodiment, in the composite cathode active material, the third metal may be doped on a lithium nickel transition metal oxide. Since the third metal is doped on the lithium nickel transition metal oxide, the structural stability of the lithium nickel transition metal oxide is improved.

The lithium nickel transition metal oxide of the composite cathode active material may include lithium, nickel, the third metal, a fourth metal, and oxygen. The fourth metal refers to a metal other than lithium, nickel, and the third metal.

The lithium nickel transition metal oxide of the composite cathode active material may include about 0.1 moles to about 1.3 moles of lithium, based on 1 mole of the lithium nickel transition metal oxide, about 0.7 moles to about 0.99 moles of nickel based on 1 mole of the lithium nickel transition metal oxide, about 0.0005 moles to about 0.01 moles of the third metal, based on 1 mole of the lithium nickel transition metal oxide, about 0.01 moles to about 0.3 moles of the fourth metal, based on 1 mole of the lithium nickel transition metal oxide, and about 1.7 of moles to about 2.3 moles of oxygen, based on based on 1 mole of the lithium nickel transition metal oxide.

The lithium nickel transition metal oxide may be represented by, for example, Formula 4:

$$Li_aM4O_{2-\alpha}X_\alpha \quad \text{Formula 4}$$

wherein in Formula 4, $0.9 \leq a \leq 1.2$ and $0 \leq \alpha < 2$,

M4 includes nickel, the third metal, and the fourth metal, the fourth metal is a Group 2 element to a Group 13 element other than nickel, the third metal, or a combination thereof, X is F, S, or P, and the amount of nickel in M4 is 70 mol % to less than 100 mol %. The lithium nickel transition metal oxide represented by Formula 4 may include a third metal, which can be introduced by doping, for example.

The lithium nickel transition metal oxide may be represented by, for example, Formula 5:

$$Li_aNi_bM5_cM6_dM7_eO_{2-\alpha}X_\alpha \quad \text{Formula 5}$$

wherein in Formula 5, $0.9 \leq a \leq 1.2$, $0.7 < b < 1$, $0 < c < 0.3$, $0 < d < 0.3$, $0 \leq e < 0.1$, $b+c+d+e=1$, and $0 \leq \alpha < 2$, M5, M6, and M7 are different from each other, and each of which is cobalt (Co), manganese (Mn), zirconium (Zr), aluminum (Al), rhenium (Re), vanadium (V), chromium (Cr), iron (Fe), boron (B), ruthenium (Ru), titanium (Ti), niobium (Nb), molybdenum (Mo), magnesium (Mg), or platinum (Pt), and X is F, S, or P. The lithium nickel transition metal oxide represented by Formula 5 may further include the third metal that can be used for doping The lithium nickel transition metal oxide may be represented by, for example, one of Formulae 6 and 7:

$$Li_aNi_bCo_cMn_dM8_eO_{2-\alpha}X_\alpha \quad \text{Formula 6}$$

$$Li_aNi_bCo_cAl_dM8_eO_{2-\alpha}X_\alpha \quad \text{Formula 7}$$

wherein in Formulae 6 and 7, a, b, c, d, e and α are each independently 0.9≤a≤1.2, 0.7<b<1, 0<c<0.1, 0<d<0.1, 0≤e<0.01, b+c+d+e=1, and 0≤α<2, M8 may zirconium (Zr), aluminum (Al), vanadium (V), chromium (Cr), iron (Fe), rhenium (Re), boron (B), ruthenium (Ru), titanium (Ti), niobium (Nb), molybdenum (Mo), magnesium (Mg), or platinum (Pt), and X is F, S, or P. The lithium nickel transition metal oxide represented by one of Formulae 6 and 7 may further include the third metal that can be used for doping.

The lithium nickel transition metal oxide of the composite cathode active material may include, for example, a first layered phase having a structure belonging to the C2/m space group, a second layered phase having a structure belonging to the space group R-3m, or a combination thereof. The lithium nickel transition metal oxide may be, for example, a composite of the first layered phase and the second layered phase.

The lithium nickel transition metal oxide may include, for example, the second layered phase having a composition represented by Formula 8a and belonging to a C2/m space group, and a third layered phase having a composition represented by Formula 8b and belonging to a space group R-3m.

$Li_2MnO_3$   Formula 8a $LiMO_2$   Formula 8b wherein in Formula 8b, M may include nickel (Ni) and cobalt (Co), manganese (Mn), vanadium (V), chromium (Cr), iron (Fe), zirconium (Zr), rhenium (Re), aluminum (Al), boron (B), ruthenium (Ru), titanium (Ti), niobium (Nb), molybdenum (Mo), magnesium (Mg), platinum (Pt), or a combination thereof. At least a portion of M is Ni. An amount of Ni in M may be about 70 mol % or greater, for example, about 70 mol % to about 99 mol %. The second layered phase represented by Formula 8b may include, for example, the third metal used for doping.

The lithium nickel transition metal oxide may be represented by, for example, Formula 8:

$aLi_2MnO_3\text{-}(1-a)LiMO_{2-\alpha}X_\alpha$ 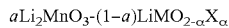  Formula 8 wherein in Formula 8, 0<a<1 and 0≤α<2,

M may include nickel (Ni) and cobalt (Co), manganese (Mn), zirconium (Zr), aluminum (Al), rhenium (Re), vanadium (V), chromium (Cr), iron (Fe), boron (B), ruthenium (Ru), titanium (Ti), niobium (Nb), molybdenum (Mo), magnesium (Mg), platinum (Pt), or a combination thereof, and X is F, S, or P. At least a portion of M is Ni. An amount of Ni in M may be about 70 mol % or greater, for example, about 70 mol % to about 99 mol %. The lithium nickel transition metal oxide represented by Formula 8 may include the third metal doped thereon.

Alternatively, the lithium nickel transition metal oxide may be, for example, a solid solution of a first layered phase having a structure belonging to the C2/m space group. When the lithium nickel transition metal oxide has a solid solution structure belonging to the C2/m space group, the lithium nickel transition metal oxide may be represented by Formulae 4a, 5a, 6a and 7a, wherein each of Formulae 4a to 7a is the same as Formula 4 to 7 except that 1.0<a≤1.2 and 0.8≤b+c+d+e<1.

A cathode according to an embodiment includes the composite cathode active material described above. Since the cathode includes the composite cathode active material described above, improved cyclic characteristics and thermal stability may be provided.

The cathode is prepared, for example, by the following exemplary method, but the preparation method for the cathode is not necessarily limited thereto and can be adjusted as desired without undue experimentation.

The composite cathode active material, a conductive material, a binder, and a solvent are mixed to prepare a cathode active material composition. The cathode active material composition may be directly coated on an aluminum current collector and dried to form a cathode plate including a cathode active material layer. In an embodiment, the cathode active material composition is cast on a separate support, and then a film exfoliated from the support and laminated on the aluminum current collector to prepare the cathode plate including a cathode active material layer.

Examples of the conductive material are carbon black, graphite particulate, natural graphite, artificial graphite, acetylene black, ketjen black, carbon fiber; carbon nanotube; copper, nickel, aluminum, or silver, in the form of metal powder, metal fiber, or metal tube; and a conductive polymer, such as polyphenylene derivative, but the conductive material is not limited thereto and may be any suitable conductive material.

Examples of the binder are a vinylidene fluoride/hexafluoropropylene copolymer, polyvinylidenefluoride, polyacrylonitrile, polymethylmethacrylate, polytetrafluoroethylene ("PTFE"), a mixture of these polymers, and a styrene butadiene rubber-based polymer. As a solvent available herein, N-methylpyrrolidone ("NMP"), acetone, water, or the like may be used. However, the solvent is not limited thereto, and may be any suitable materials.

The cathode active material composition may further include a plasticizer or pore-forming agent to form pores in an electrode plate.

The amounts of the composite cathode active material, the conductive material, the binder, and the solvent used for the cathode are at the same levels as typically used in a secondary battery. According to the purpose and structure of a secondary battery, at least one of the conductive material, the binder, and the solvent may not be used.

In an embodiment, the cathode may additionally include other composite cathode active materials than the composite cathode active material.

The additional cathode active material may comprise a lithium-containing metal oxide. Such a lithium-containing metal oxide may be at least one composite oxide that includes lithium and cobalt, manganese, nickel, or a combination thereof, and the at least one composite oxide may be represented by $Li_aA_{1-b}B'_bD_2$ (wherein 0.90≤a≤1, and 0≤b≤0.5); $Li_aE_{1-b}B'_bO_{2-c}D_c$ (wherein 0.90≤a≤1, 0≤b≤0.5, 0≤c≤0.05); $LiE_{2-b}B'_bO_{4-c}D_c$ (wherein 0≤b≤0.5, 0≤c≤0.05); $Li_aNi_{1-b-c}Co_bB'_cD_\alpha$ (wherein 0.90≤a≤1, 0≤b≤0.5, 0≤c≤0.05, 0<α≤2); $Li_aNi_{1-b-c}Co_bB'_cO_{2-\alpha}F_\alpha$ (wherein 0.90≤a≤1, 0≤b≤0.5, 0≤c≤0.05, 0<α<2); $Li_aNi_{1-b-c}Co_bB'_cO_{2-\alpha}F'_2$ (wherein 0.90≤a≤1, 0≤b≤0.5, 0≤c≤0.05, 0<α<2); $Li_aNi_{1-b-c}Mn_bB'_cD_\alpha$ (wherein 0.90≤a≤1, 0≤b≤0.5, 0≤c≤0.05, 0≤α≤2); $Li_aNi_{1-b-c}Mn_bB'_cO_{2-\alpha}F'_\alpha$ (wherein 0.90≤a≤1, 0≤b≤0.5, 0≤c≤0.05, 0<α<2); $Li_aNi_{1-b-c}Mn_bB'_cO_{2-\alpha}F'_2$ (wherein 0.90≤a≤1, 0≤b≤0.5, 0≤c≤0.05, 0<α<2); $Li_aNi_bE_cG_dO_2$ (wherein 0.90≤a≤1, 0≤b≤0.9, 0≤c≤0.5, 0.001≤d≤0.1); $Li_aNi_bCo_cMn_dGeO_2$ (wherein 0.90≤a≤1, 0≤b≤0.9, 0≤c≤0.5, 0≤d≤0.5, 0.001≤e≤0.1); $Li_aNiG_bO_2$ (wherein 0.90≤a≤1, 0.001≤b≤0.1); $Li_aCoG_bO_2$ (wherein 0.90≤a≤1, 0.001≤b≤0.1); $Li_aMnG_bO_2$ (wherein 0.90≤a≤1, 0.001≤b≤0.1); $Li_aMn_2G_bO_4$ (wherein 0.90≤a≤1, $0.001 \leq b \leq 0.1$); $QO_2$; $QS_2$; $LiQS_2$; $V_2O_5$; $LiV_2O_5$; $LiI'O_2$; $LiNiVO_4$; $Li_{(6-f)}J_2(PO_4)_3$ ($0 \leq f \leq 2$); $Li_{(3-f)}Fe_2(PO_4)_3$ ($0 \leq f \leq 2$); or $LiFePO_4$.

In the formulae above, A is Ni, Co, Mn, or a combination thereof; B' is Al, Ni, Co, Mn, Cr, Fe, Mg, Sr, V, a rare-earth element, or a combination thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

These compounds may be used with a coating layer thereon, and a mixture of a compound with a coating layer thereon and a compound without a coating layer thereon may be used The coating layer may include an oxide of a coating element, a hydroxide of a coating element, an oxyhydroxide of a coating element, an oxycarbonate of a coating element, or a hydroxycarbonate of a coating element. Compounds constituting these coating layers may be amorphous or crystalline. As a coating element included in a coating layer, Mg, Al, Co, K, Na, Ca, Si, Ti, V, Sn, Ge, Ga, B, As, Zr, or a combination thereof may be used. The method of forming the coating layer can be selected so long as the method does not adversely affect the physical properties of the cathode active material. Coating methods include, for example, spray coating, dipping, and the like. Details of these coating methods are well understood by those skilled in the art, so a detailed description thereof will be omitted.

The cathode may include, for example, the composite cathode active material described above, and an olivine-based cathode active material.

The olivine-based cathode active material may be represented, for example, by Formula 9 below.

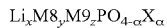

$$Li_xM8_yM9_zPO_{4-\alpha}X_\alpha \quad \text{Formula 9}$$

wherein in Formula 9, $0.90 \leq x \leq 1.1$, $0 \leq y \leq 0.9$, $0 \leq z \leq 0.5$, $1-y-z>0$, and $0 \leq \alpha \leq 2$, M8 is Ti, V, Cr, Mn, Fe, Co, Ni, Cu, Al, Mg, Zr, B, or a combination thereof, M9 is Mg, Ca, Sr, Ba, Ti, Zr, Nb, Mo, W, Zn, Al, Si, Ni, Mn, Cr, Fe, Mg, Sr, V, a rare-earth element, or a combination thereof, and X is F, S, or P. The olivine-based cathode active material may be, for example, $LiFePO_4$, $LiNiPO_4$, $LiMnPO_4$, or $LiCoPO_4$.

The amount of the olivine-based cathode active material included in the cathode may be, for example, about 10 weight percent (wt %) or less, about 9 wt % or less, about 8 wt % or less, about 7 wt % or less, about 6 wt % or less, or about 5 wt % or less, based on the total weight of the cathode active material. The amount of the olivine-based cathode active material included in the cathode may be, for example, in the range of about 1 to about 10 wt %, about 1 wt % to about 9 wt %, about 1 wt % to about 8 wt %, about 1 wt % to about 7 wt %, about 1 wt % to about 6 wt % or about 1 wt % to about 5 wt %, based on the total weight of the cathode active material. The amount of the olivine-based cathode active material included in the cathode may be, for example, about 1 part by weight to about 10 parts by weight, about 1 part by weight to about 9 parts by weight, about 1 part by weight to about 8 parts by weight, about 1 part by weight to about 7 parts by weight, about 1 part by weight to about 6 parts by weight, or about 1 part by weight to about 10 parts by weight, based on 100 parts by weight of the composite cathode active material. Since the cathode includes such amount ranges of olivine-based cathode active material, the cyclic characteristics and mixed density of a lithium battery may be improved.

An embodiment provides a lithium battery including the cathode including the composite cathode active material.

Since the lithium battery includes the cathode including the composite cathode active material described above, improved cyclic characteristics and thermal stability may be provided.

The lithium battery is prepared, for example, by the following example method, but the preparation method is not limited thereto and may be adjusted as desired.

First, a cathode is manufactured according to the above-described cathode production method.

Next, an anode is manufactured as follows. The anode is manufactured in the substantially the same manner as used to produce the cathode, except that, for example, an anode active material was used instead of the composite cathode active material. The conductive material, the binder, and the solvent which constitute the anode active material composition may be the same as used to produce the cathode.

For example, the anode active material, the conductive material, the binder, and the solvent are mixed to prepare an anode active material composition, which is then directly coated on a copper current collector to complete the preparation of an anode plate. In an embodiment, the anode active material composition is cast on a separate support, and an anode active material film exfoliated from the support is laminated on the copper current collector, thereby completing the preparation of an anode plate.

The anode active material may be any suitable material that can be used as an anode active material for a lithium battery. The anode active material may be lithium metal, a lithium-alloyable metal, a transition metal oxide, a non-transition metal oxide, a carbonaceous material, or a combination thereof.

In an embodiment, the lithium-alloyable metal may be Si, Sn, Al, Ge, Pb, Bi, Sb, Si—Y' alloy (where Y' is alkali metal, alkali earth metal, a Group 13 element, a Group 14 element, transition metal, rare earth element, or a combination thereof element and is not Si), or Sn—Y" alloy (where Y" is alkali metal, alkali earth metal, a Group 13 element, a Group 14 element, transition metal, rare earth element, or a combination thereof element and is not Sn). The element Y' or Y" may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

In an embodiment, the transition metal oxide may be a lithium titanium oxide, a vanadium oxide, a lithium vanadium oxide, or the like.

In an embodiment, the non-transition metal oxide may be $SnO_2$, $SiO_x$ ($0<x<2$), or the like.

In an embodiment, the carbonaceous material may be a crystalline carbon, an amorphous carbon, or a mixture thereof. In an embodiment, the crystalline carbon may be natural or artificial graphite that is non-shaped, tabular, flake, spherical, or fibrous. In an embodiment, the amorphous carbon may be soft carbon (cold calcined carbon) or hard carbon, meso-phase pitch carbide, calcined corks, or the like.

The amounts of the anode active material, the conductive material, the binder, and the solvent used for the anode are at the same levels as typically used in a secondary battery. According to the purpose and structure of a secondary battery, at least one of the conductive material, the binder, and the solvent may not be used.

Next, a separator to be inserted between the cathode and the anode is prepared.

The separator may be any suitable separator that is typically used in a secondary battery, such as a lithium battery. A material for forming the separator may be a material that has a low resistance to ion migration of an electrolyte and has excellent electrolytic solution-retaining capability. In an embodiment, the separator forming material may be glass fiber, polyester, Teflon™, polyethylene, polypropylene, polytetrafluoroethylene ("PTFE"), or a combination thereof, each of which may be in a non-woven fabric or woven fabric form. In an embodiment, a separator for a lithium ion battery may be a rollable separator formed of polyethylene or polypropylene, and a separator for a lithium ion polymer battery may be a separator having excellent organic electrolyte-retaining capabilities.

The separator is prepared, for example, by the following exemplary method, but the preparation method for the separator is not necessarily limited thereto and is adjusted according to the required conditions.

First, a separator composition is prepared by mixing a polymer resin, a filler, and a solvent. The separator composition may be directly coated on a cathode plate or an anode plate to form the separator. In some embodiment, the separator composition may be cast and dried on a support, and a separator film exfoliated from the support is laminated on an electrode to complete the preparation of the separator.

A polymer used in preparing the separator may not be particularly limited, and any suitable material that can be used as a binder for an electrode plate may be used. Examples of the polymer resin are a vinylidenefluoride/hexafluoropropylene copolymer, polyvinylidenefluoride ("PVDF"), polyacrylonitrile, polymethylmethacrylate, and a mixture thereof.

Next, an electrolyte is prepared.

The electrolyte may be, for example, an organic electrolytic solution. The organic electrolytic solution is prepared by dissolving a lithium salt in an organic solvent.

The organic solvent may be any suitable material that can be used as an organic solvent. Examples of the organic solvent are propylenecarbonate, ethylenecarbonate, fluoroethylenecarbonate, butylenecarbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofurane, 2-methyltetrahydrofurane, γ-butyrolactone, dioxorane, 4-methyldioxorane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, dimethylether, or a combination thereof.

The lithium salt may be any suitable material that can be used as a lithium salt. The lithium salt may be, for example, $LiPF_6$, $LiBF_4$, $LiSbFe$, $LiAsFe$, $LiClO_4$, $LiCF_3SO_3$, $Li(CF_3SO_2)_2N$, $LiC_4FSO_3$, $LiAlO_2$, $LiAlCl_4$, $LiN(C_xF_{2x+1}SO_2)(C_yF_{2y+1}SO_2)$, wherein x and y are natural numbers, LiCl, LiI, or a combination thereof.

In an embodiment, the electrolyte may be a solid electrolyte. The solid electrolyte may be boron oxide, lithium oxynitride, or the like, but is not limited thereto. The solid electrolyte may be any suitable material that can be used as a solid electrolyte. The solid electrolyte may be formed on the anode by, for example, sputtering, or a separate solid electrolyte sheet may be stacked on the anode.

Figure 5:
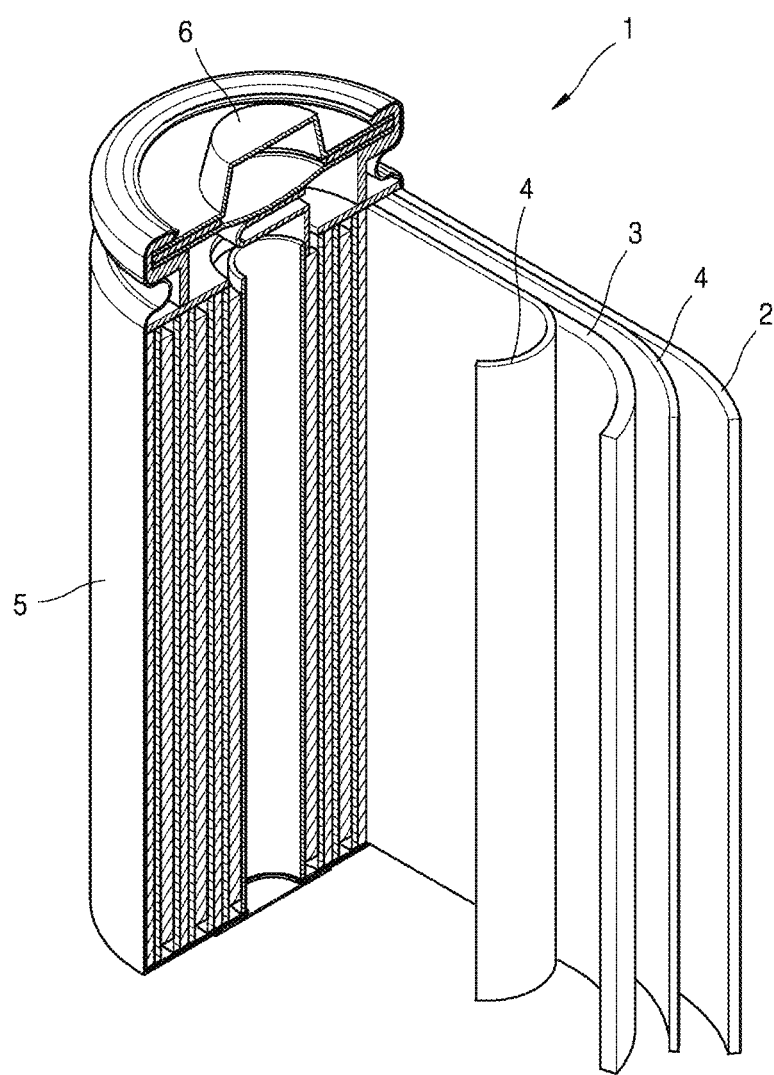
FIG. 5 shows a schematic diagram of an embodiment of a lithium battery.

As shown in FIG. 5, a lithium battery 1 includes a cathode 3, an anode 2, and a separator 4. The cathode 3, the anode 2 and the separator 4 are wound or folded and accommodated in a battery case 5. An organic electrolytic solution is injected into the battery case 5 and sealed with a cap assembly 6 to complete the production of the lithium battery 1. The battery case 5 is cylindrical, but is not necessarily limited to this shape, and may have, for example, a rectangular shape, a thin-film shape, or the like.

A pouch-shaped lithium battery includes one or more battery assemblies. A battery assembly is formed by placing a separator between a cathode and an anode. Battery assemblies are stacked in a bi-cell structure, impregnated with an organic electrolytic solution, and housed and sealed in a pouch to complete the production of a pouch-type lithium battery. In an embodiment, a plurality of battery assemblies are stacked to form a battery pack, which is used in all devices requiring high capacity and high output. For example, the battery pack may be used in notebooks, smartphones, electric vehicles, and the like.

Since a lithium battery has excellent lifetime characteristics and high-rate characteristics, the lithium battery may be used in, for example, an electric vehicle ("EV"). For example, the lithium battery may be used in a hybrid vehicle such as a plug-in hybrid electric vehicle ("PHEV"). In an embodiment, the lithium battery may be used in fields where a large amount of power storage is required. In an embodiment, the lithium battery may be used in an electric bicycle, an electric power tool, etc.

An embodiment provides a method of preparing the composite cathode active material, the method: including preparing a lithium nickel transition metal oxide; preparing a mixed composition by adding a first metal precursor and a second metal precursor to the lithium nickel transition metal oxide sequentially or simultaneously; and drying and heat treating the mixed composition at a temperature of about 400° C. to about 1000° C. in an oxidizing atmosphere.

The adding of the first metal precursor and the second metal precursor to the lithium nickel transition metal oxide sequentially to prepare a mixed composition may include, for example, mixing the lithium nickel transition metal oxide and the first metal precursor to prepare a first composition of the lithium nickel transition metal oxide; and mixing the first composition of lithium nickel transition metal oxide and the second metal precursor to prepare the mixed composition of the lithium nickel transition metal oxide.

The adding of the first metal precursor and the second metal precursor to the lithium nickel transition metal oxide simultaneously to prepare a mixed composition may include, for example, mixing the lithium nickel transition metal oxide with the first metal precursor and the second metal precursor to prepare the mixed composition of the lithium nickel transition metal oxide.

The preparing of the mixed composition may be performed by, for example, a wetting process using, a solvent. The first composition and the mixed composition may each include a solvent that is capable of dissolving the first metal precursor and the second metal precursor. In this regard, the solvent is not limited, and may be any suitable material that can be used as a solvent. The solvent may be, for example, distilled water. For example, each of the first metal precursor and the second metal precursor may be used in an aqueous form.

The first metal precursor may be the nitrate, oxychloride, oxynitrate, or the like of the first metal, but is not limited thereto. The first metal precursor may be any suitable material that can be used as a dissociation salt containing the first metal. For example, the first metal precursor may be $Co(NO_3)_2 \cdot 6H_2O$, $Mg(NO_3)_2 \cdot 6H_2O$, or the like. In the first composition, the hydroxide of the first metal precipitates on the surface of the first lithium metal oxide. The hydroxide of the first metal may be, for example, $Co(OH)_2$, $Mg(OH)_2$, or the like.

The second metal precursor may be nitrate, oxychloride, oxynitrate, or the like of the second metal, but is not limited thereto. The second metal precursor may be any suitable material that can be used as a dissociation salt containing the second metal. For example, the second metal precursor may be $Ce(NO_3)_2 \cdot 6H_2O$, $CeCl_3$, $CeCl_3 \cdot 7H_2O$, $Ce(SO_4)_2$, $Ce(SO_4)_2 \cdot 4H_2O$, $Ce_2(SO_4)_3$, $Ce_2(SO_4)_3 \cdot 8H_2O$, $Ce(NH_4)_2(NO_3)_6$, $Ce(NH_4)_4(SO_4)_4 \cdot 2H_2O$, $Ce(C_5H_7O_2)_3 \cdot XH_2O$, or $Ce(CH_3CO_2)_3 \cdot XH_2O$. "$xH_2O$" refers to a hydrate, where the water content may vary depending on humidity, for example.

The oxidizing atmosphere is an atmosphere containing oxygen or air. The oxidizing atmosphere contains oxygen, air, or a combination thereof, for example air with increased oxygen content.

The amount of the first metal precursor in the first composition or the mixed composition may be about 30 parts by weight or less, for example, about 1 to about 25 parts by weight; about 20 parts by weight or less, for example, about 2 to about 15 parts by weight; or about 10 parts by weight or less, for example, about 3 to about 9 parts by weight, based on 100 parts by weight of the lithium nickel transition metal oxide. The amount of the solvent in the first composition or the mixed composition may be about 300 parts by weight or less, for example, about 1 to about 250 parts by weight; about 200 parts by weight or less, for example, about 5 to about 150 parts by weight; or about 100 parts by weight or less, for example, about 10 to about 75 parts by weight, based on 100 parts by weight of the lithium nickel transition metal oxide. The amount of the second metal precursor in the mixed composition may be about 30 parts by weight or less, for example, about 1 to about 25 parts by weight; about 20 parts by weight or less, for example, about 2 to about 15 parts by weight; or about 10 parts by weight or less, for example, about 3 to about 9 parts by weight, based on 100 parts by weight of the lithium nickel transition metal oxide. The amount of the solvent in the mixed composition may be about 300 parts by weight or less, about 200 parts by weight or less, for example, about 1 to about 250 parts by weight; or about 100 parts by weight or less, for example, about 10 to about 75 parts by weight, based on 100 parts by weight of the lithium nickel transition metal oxide.

The heat treatment may be performed at the temperature of, for example, about 400° C. to about 1000° C., about 500° C. to about 900° C., about 600° C. to about 800° C., or about 700° C. to about 750° C. The heat treatment time may be, for example, in the range of about 3 hours to about 20 hours, about 3 hours to about 15 hours, about 3 hours to about 10 hours, about 3 hours to about 7 hours, or about 4 hours to about 6 hours. The rate of temperature rise to reach the temperature at which the heat treatment is carried out may be, for example, about 1° C. per minute (° C./min) to about 10° C./min. Since the heat treatment temperature, the heat treatment time, and the temperature raising speed have these ranges, a shell including a first layer on the core and a second layer on the first layer may be formed on a core.

In the method of preparing the composite cathode active material, the preparing of the lithium nickel transition metal oxide includes mixing a precursor for the lithium nickel transition metal oxide and the third metal precursor to prepare a mixture; and heat treating the mixture at a temperature of about 400° C. to about 1000° C. in an oxidizing atmosphere to prepare the lithium nickel transition metal oxide.

The preparing of the mixture may be performed by, for example, a dry process without a solvent. The mixture may be, for example, dry powder prepared by mixing powder of the lithium nickel transition metal oxide precursor and powder of third metal precursor. In an embodiment, the preparing of the mixture may be performed by, for example, a wetting process using a solvent. The mixture may include a solvent that is capable of dissolving the precursor of the lithium nickel transition metal oxide and the third metal precursor. In this regard, the solvent is not limited, and may be any suitable material that can be used as a solvent. The solvent may be, for example, distilled water. Due to the wet process, the third composition containing the third metal may be included at a relatively high concentration at the grain boundary between primary particles.

The oxidizing atmosphere is an atmosphere containing oxygen or air. The oxidizing atmosphere contains oxygen, air, or a combination thereof, for example air with increased oxygen content.

The third metal precursor may be, for example, the oxide or hydroxide of the third metal, but is not limited thereto. In this regard, the third metal precursor may be any suitable material that contains the third metal. For example, the third metal precursor may be, for example, $ZrO_2$ or $Al_2O_3$.

The amount of the third metal precursor in the mixed composition may be about 30 parts by weight or less, for example, about 1 to about 25 parts by weight; about 20 parts by weight or less, for example, about 2 to about 15 parts by weight; or 10 parts by weight or less, for example, about 3 to about 9 parts by weight, based on 100 parts by weight of the precursor of the lithium nickel transition metal oxide.

The heat treatment may be performed at, for example, about 400° C. to about 1000° C., about 500° C. to about 900° C., about 600° C. to about 800° C., or about 700° C. to about 750° C. The heat treatment time may be, for example, in the range of about 3 hours to about 20 hours, about 3 hours to about 15 hours, about 3 hours to about 10 hours, about 3 hours to about 7 hours, or about 4 hours to about 6 hours. The incremental rate of temperature to reach the temperature at which the heat treatment is carried out may be, for example, about 1° C./min to about 10° C./min. When the heat treatment temperature, the heat treatment time, and the incremental rate are within these ranges, the third composition including the third metal is formed at the grain boundary between primary particles, and the third metal is doped on the lithium nickel transition metal oxide.

Embodiments of the present disclosure will be described in more detail with reference to the following examples and comparative examples. These examples are provided herein for illustrative purpose only, and do not limit the scope of the present disclosure.

EXAMPLES

Preparation of Composite Cathode Active Material

Example 1: Ni88+Al-Zr Doping, $Li_2ZrO_3$ Grain Boundary Coating+Co:Ce=0.5 Weight Percent (Wt %): 1.5 wt %, Two-Layered Coating Layer Preparation of Core Zirconium oxide ($ZrO_2$) and alumina ($Al_2O_3$), which are each a second metal precursor, $Ni_{0.88}Co_{0.06}Mn_{0.04}(OH)_2$ (Lanzhou JinTong energy storage power new material Co., Ltd., China), which is a lithium nickel transition metal oxide precursor, and LiOH or LiOH.H$_2$O, which is a lithium precursor, were mixed at a molar ratio of 0.003:0.0005:0.996:1.09 to prepare a mixture. The mixture was put into a furnace and subjected to a primary heat treatment at a temperature of 750° C. for 5 hours while flowing oxygen to prepare a core.

Due to the primary heat treatment, Al and Zr-doped Li$_{1.09}$(Ni$_{0.88}$Co$_{0.06}$Mn$_{0.04}$)$_{1-x-y}$Al$_x$Zr$_y$O$_2$ (x=0.001, y=0.003) core, which is the lithium nickel transition metal oxide, was obtained.

Also, a Li$_2$ZrO$_3$ coating layer having a monoclinic crystal structure was formed on the surface of the core and in a grain boundary among a plurality of primary particles.

Preparation of Shell

Co(NO$_3$)$_2$.6H$_2$O precursor in the first layer of the composite cathode active material was prepared in such a way that the amount of Co was in the range of 0.5 parts by weight, based on 100 parts by weight of the lithium nickel transition metal oxide, and then the mixture was added to 10 parts by weight of distilled water, and stirred at room temperature (25° C.) for 1 minute to prepare a first aqueous solution.

Ce(NO$_3$)$_2$.6H$_2$O precursor in the second layer of the composite cathode active material was prepared in such a way that the amount of Ce was in the range of 1.5 parts by weight, based on 100 parts by weight of the lithium nickel transition metal oxide, and then the mixture was added to 10 parts by weight of distilled water, and stirred at room temperature (25° C.) for 1 minute to prepare a second aqueous solution.

100 parts by weight of Li$_{1.09}$(Ni$_{0.88}$Co$_{0.08}$Mn$_{0.04}$)$_{1-x-y}$Al$_x$Zr$_y$O$_2$ (x=0.001, y=0.003) core powder was added to 90 parts by weight of distilled water to prepare a third aqueous solution, and while stirring at room temperature for 10 minutes, the first aqueous solution and the second aqueous solution were added sequentially in this order to prepare a mixture.

The mixture was dried in an oven at a temperature of 150° C. for 15 hours to prepare a dried product.

The dried product was put into a furnace and subjected to a heat treatment at a temperature of 720° C. for 5 hours while flowing oxygen to prepare a composite cathode active material.

A first layer including LiCoO$_2$ and Co$_3$O$_4$ was formed on the surface of Li$_{1.09}$(Ni$_{0.88}$Co$_{0.08}$Mn$_{0.04}$)$_{1-x-y}$Al$_x$Zr$_y$O$_2$ (x=0.001, y=0.003) core, and a second layer including CeO$_2$ was formed on the first layer.

The amount of Co in the first layer was 0.5 parts by weight, based on 100 parts by weight of the lithium nickel transition metal oxide, and the amount of Ce in the second layer was 1.5 parts by weight, based on 100 parts by weight of the lithium nickel transition metal oxide.

Example 2: Ni88+Al-Zr Doping, Li$_2$ZrO$_3$ Grain Boundary Coating+Co:Ce=0.75 wt %:1.5 Wt %, Two-Layered Coating Layer The composite cathode active material was prepared in the same manner as in Example 1, except that the amount of Co(NO$_3$)$_2$.6H$_2$O precursor was changed such that the amount of Co in the first layer of the composite cathode active material was 0.75 parts by weight, based on 100 parts by weight of the lithium nickel transition metal oxide. The amount of Co in the first layer was 0.75 parts by weight, based on 100 parts by weight of the lithium nickel transition metal oxide, and the amount of Ce in the second layer was 1.5 parts by weight, based on 100 parts by weight of the lithium nickel transition metal oxide.

Example 3: Ni88+Al-Zr Doping, Li$_2$ZrO$_3$ Grain Boundary Coating+Co:Ce=0.5 wt %:1.5 Wt %, One-Layered Composite Coating Layer The composite cathode active material was prepared in the same manner as in Example 2, except that in preparing the shell, the first aqueous solution and the second aqueous solution were simultaneously added to the third aqueous solution.

A composite layer including Co and Ce was formed on the surface of the Li$_{1.09}$(Ni$_{0.88}$Co$_{0.06}$Mn$_{0.04}$)$_{1-x-y}$Al$_x$Zr$_y$O$_2$ (x=0.001, y=0.003) core.

The amount of Co in the first layer was 0.5 parts by weight, based on 100 parts by weight of the lithium nickel transition metal oxide, and the amount of Ce in the first layer was 1.5 parts by weight, based on 100 parts by weight of the lithium nickel transition metal oxide.

Example 4: Ni88+Al Doping (Zr-Free)+Co:Ce=0.5 wt %:1.5 wt %, Two-Layered Coating Layer The composite cathode active material was prepared in the same manner as in Example 1, except that, in preparing the core, as the second metal precursor, alumina (Al$_2$O$_3$) was used and zirconium oxide (ZrO$_2$) was not used.

Due to the primary heat treatment, an Al-doped Li$_{1.09}$(Ni$_{0.88}$Co$_{0.08}$Mn$_{0.04}$)$_{1-x}$Al$_x$O$_2$ (x=0.003) core was obtained.

The amount of Co in the first layer was 0.5 parts by weight, based on 100 parts by weight of the lithium nickel transition metal oxide, and the amount of Ce in the second layer was 1.5 parts by weight, based on 100 parts by weight of the lithium nickel transition metal oxide.

Comparative Example 1: Ni88 Core

Li$_{1.09}$(Ni$_{0.88}$Co$_{0.06}$Mn$_{0.04}$)$_{1-x-y}$Al$_x$Zr$_y$O$_2$ (x=0.001, y=0.003) core powder prepared by the primary heat treatment in Example 1 was used.

Comparative Example 2: Ni88 Core+Washing 100 parts by weight of Li$_{1.09}$(Ni$_{0.88}$Co$_{0.08}$Mn$_{0.04}$)$_{1-x-y}$Al$_x$Zr$_y$O$_2$ (x=0.001, y=0.003) core powder prepared in the process of the primary heat treatment of Example 1 was added to 90 parts by weight of distilled water. After stirring, the precipitate was filtered and separated to remove residual lithium. This washing process was performed once.

The separated precipitate was dried in an oven at a temperature of 150° C. for 15 hours to prepare a dried product.

The dried product was put into a furnace and subjected to a heat treatment at a temperature of 720° C. for 5 hours while flowing oxygen to prepare a composite cathode active material.

Comparative Example 3: Ni88+Al-Zr Doping, Li$_2$ZrO$_3$ Grain Boundary Coating+Co:Ce=0.75 wt %:0.0 wt %, Co-Only Coating Layer The composite cathode active material was prepared in the same manner as in Example 1, except that, in preparing the shell, the amount of Co(NO$_3$)$_2$.6H$_2$O precursor was changed such that the amount of Co in the first layer of the composite cathode active material was 0.75 parts by weight, based on 100 parts by weight of the lithium nickel transition metal oxide, and the second aqueous solution containing $Ce(NO_3)_2 \cdot 6H_2O$ was not used.

A first layer containing $LiCoO_2$ and $Co_3O_4$ was formed on the surface of the $Li_{1.09}(Ni_{0.88}Co_{0.06}Mn_{0.04})_{1-x-y}Al_xZr_yO_2$ (x=0.001, y=0.003) core. The second layer was not formed.

The amount of Co in the first layer was 0.75 parts by weight, based on 100 parts by weight of the lithium nickel transition metal oxide.

Comparative Example 4: Ni88+Al-Zr Doping, $Li_2ZrO_3$ Grain Boundary Coating+Co:Ce=0 Wt %:1.5 wt %, Ce-Only Coating Layer The composite cathode active material was prepared in the same manner as in Example 1, except that, in preparing the shell, the amount of $Ce(NO_3)_2 \cdot 6H_2O$ precursor was changed such that the amount of Ce in the first layer of the composite cathode active material was 1.5 parts by weight, based on 100 parts by weight of the lithium nickel transition metal oxide, and the first aqueous solution containing $Ce(NO_3)_2 \cdot 6H_2O$ was not used.

A first layer including $CeO_2$ was formed on the surface of the $Li_{1.09}(Ni_{0.88}Co_{0.08}Mn_{0.04})_{1-x-y}Al_xZr_yO_2$ (x=0.001, y=0.003) core. The second layer was not formed.

The amount of Ce in the first layer was 1.5 parts by weight, based on 100 parts by weight of the lithium nickel transition metal oxide.

Preparation of Lithium Battery (Half Cell)

Example 5

Preparation of Cathode

The composite cathode active material of Example 1, carbon conductive material (Denka Black), and polyvinylidene fluoride ("PVdF") were mixed at a weight ratio of 92:4:4 to prepare a mixture, which was then mixed with N-methylpyrrolidone ("NMP") in an agate mortar to prepare slurry. The slurry was bar coated on an aluminum current collector having a thickness of 15 micrometers (μm), dried at room temperature, dried again at a temperature of 120° C. under vacuum, and rolled and punched to produce a cathode plate having a thickness of 55 μm.

Preparation of Coin Cell

A coin cell was manufactured by using the cathode plate prepared as described above, a counter electrode including lithium metal, a polytetrafluoroethylene ("PTFE") separator, and an electrolyte including 1.15M $LiPF_6$ dissolved in ethylene carbonate ("EC"), ethylmethyl carbonate ("EMC"), dimethyl carbonate ("DMC") (a volume ratio of 3:4:3).

Examples 6 to 8

Coin cells were produced in the same manner as Example 5, except that the composite cathode active materials of Examples 2 to 4 were used instead of the composite cathode active material prepared in Example 1.

Example 9: Addition of $LiFePO_4$ (LFP)

A coin cell was produced in the same manner as in Example 5 except that 5 parts by weight of $LiFePO_4$ was added to 100 parts by weight of the composite cathode active material prepared in Example 1.

Comparative Examples 5 to 8

Coin cells were produced in the same manner as Example 5, except that the composite cathode active materials of Examples 2 to 4 were used instead of the composite cathode active material prepared in Example 1.

Manufacture of Lithium Battery (Full Cell)

Example 10

Preparation of Cathode

The composite cathode active material of Example 1, carbon conductive material (Denka Black), and polyvinylidene fluoride ("PVdF") were mixed at a weight ratio of 92:4:4 to prepare a mixture, which was then mixed with N-methylpyrrolidone ("NMP") in an agate mortar to prepare a cathode active material slurry. The slurry was bar coated on an aluminum current collector having a thickness of 15 μm, dried at room temperature, dried again at a temperature of 120° C. under vacuum, and rolled and punched to produce a cathode plate having a thickness of 55 μm.

Preparation of Anode

Graphite particles having an average particle diameter of 25 μm, a styrene-butadiene rubber ("SBR") binder (ZEON), and carboxymethyl cellulose ("CMC", NIPPON A&L) were mixed at a weight ratio of 97:1.5:1.5 and then the mixture was added to distilled water, followed by 60 minutes of stirring, thereby completing the preparation of an anode active material slurry. The anode active material slurry was coated on a copper collector having a thickness of 10 μm by using a doctor blade, dried in a hot air drier at 100° C. for 0.5 hours, dried again in a vacuum at a temperature of 120° C. for 4 hours, and roll-pressed and punched to produce an anode plate having a thickness of 65 μm.

Preparation of Coin Cell

A coin cell was manufactured by using the cathode plate and the anode plate prepared as described above, a PTFE separator, and an electrolyte including 1.15M $LiPF_6$ dissolved in ethylene carbonate ("EC"), ethylmethyl carbonate ("EMC"), dimethyl carbonate ("DMC") (a volume ratio of 3:4:3).

Examples 11 to 13

Coin cells were produced in the same manner as Example 10, except that the composite cathode active materials of Examples 2 to 4 were used instead of the composite cathode active material prepared in Example 1.

Example 14: Addition of LFP

A coin cell was produced in the same manner as in Example 10 except that 5 parts by weight of $LiFePO_4$ was added to 100 parts by weight of the composite cathode active material prepared in Example 1.

Comparative Examples 9 to 12

Coin cells were produced in the same manner as Example 10, except that the composite cathode active materials of Comparative Examples 1 to 4 were used instead of the composite cathode active material prepared in Example 1.

Comparative Example 13 (Ce 0.29 wt %)

A lithium battery (full cell) was prepared in the same manner as in Example 10, except that the composite cathode active material of Comparative Example 4 was used instead of the composite cathode active material of Example 1, and, in preparing of the shell, the amount of $Ce(NO_3)_2 \cdot 6H_2O$ precursor was changed such that the amount of Ce in the first layer of the composite cathode active material was 0.29 parts by weight, based on 100 parts by weight of the lithium nickel transition metal oxide.

Evaluation Example 1: X-Ray Diffraction ("XRD") Spectrum Evaluation

Figure 2A:
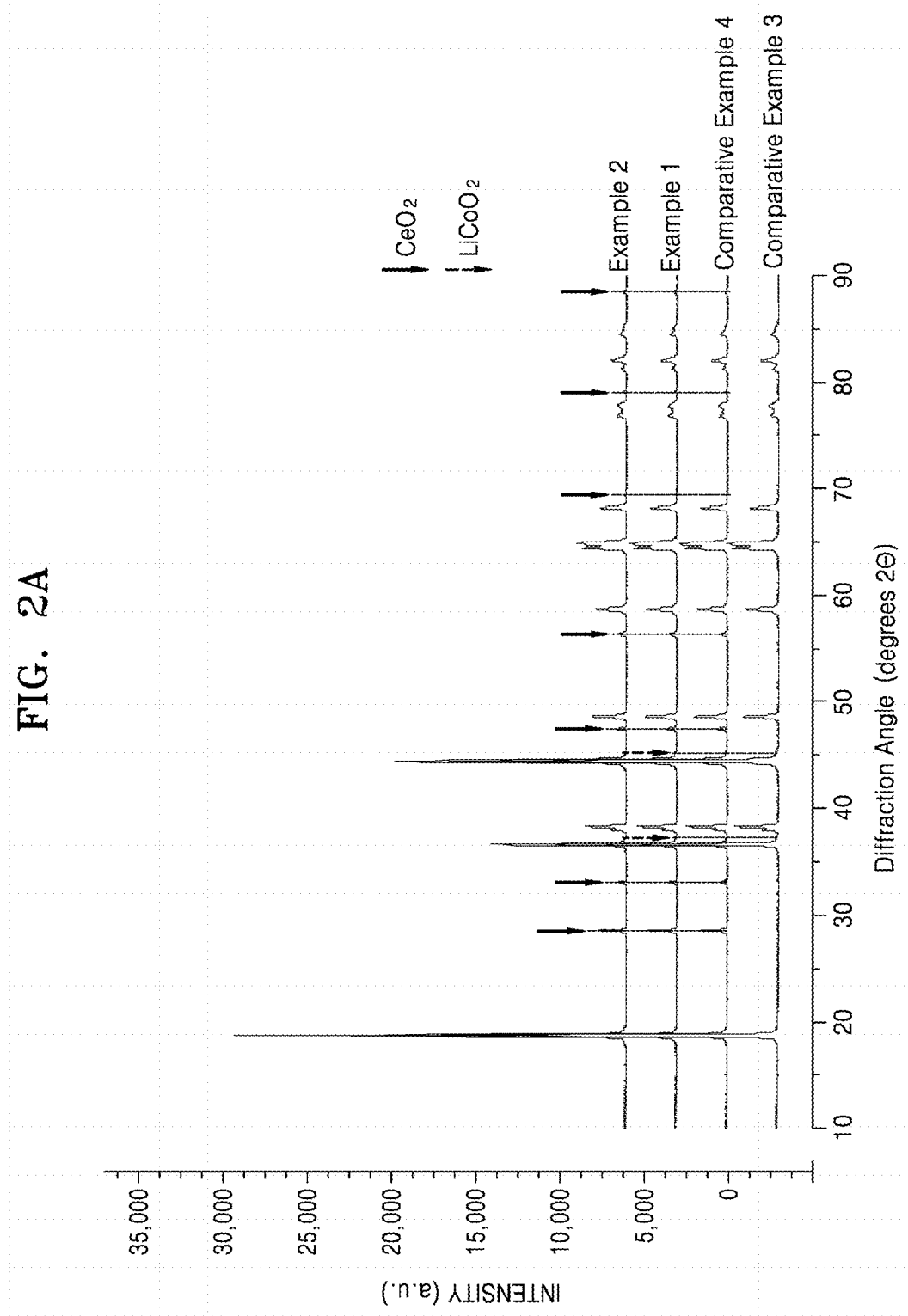
FIG. 2A is a graph of intensity (arbitrary units (a.u.)) versus diffraction angle (degrees 2θ) and shows the results of X-ray diffraction ("XRD") analysis of the composite cathode active materials of Examples 1 and 2 and Comparative Examples 3 and 4.
Figure 2B:
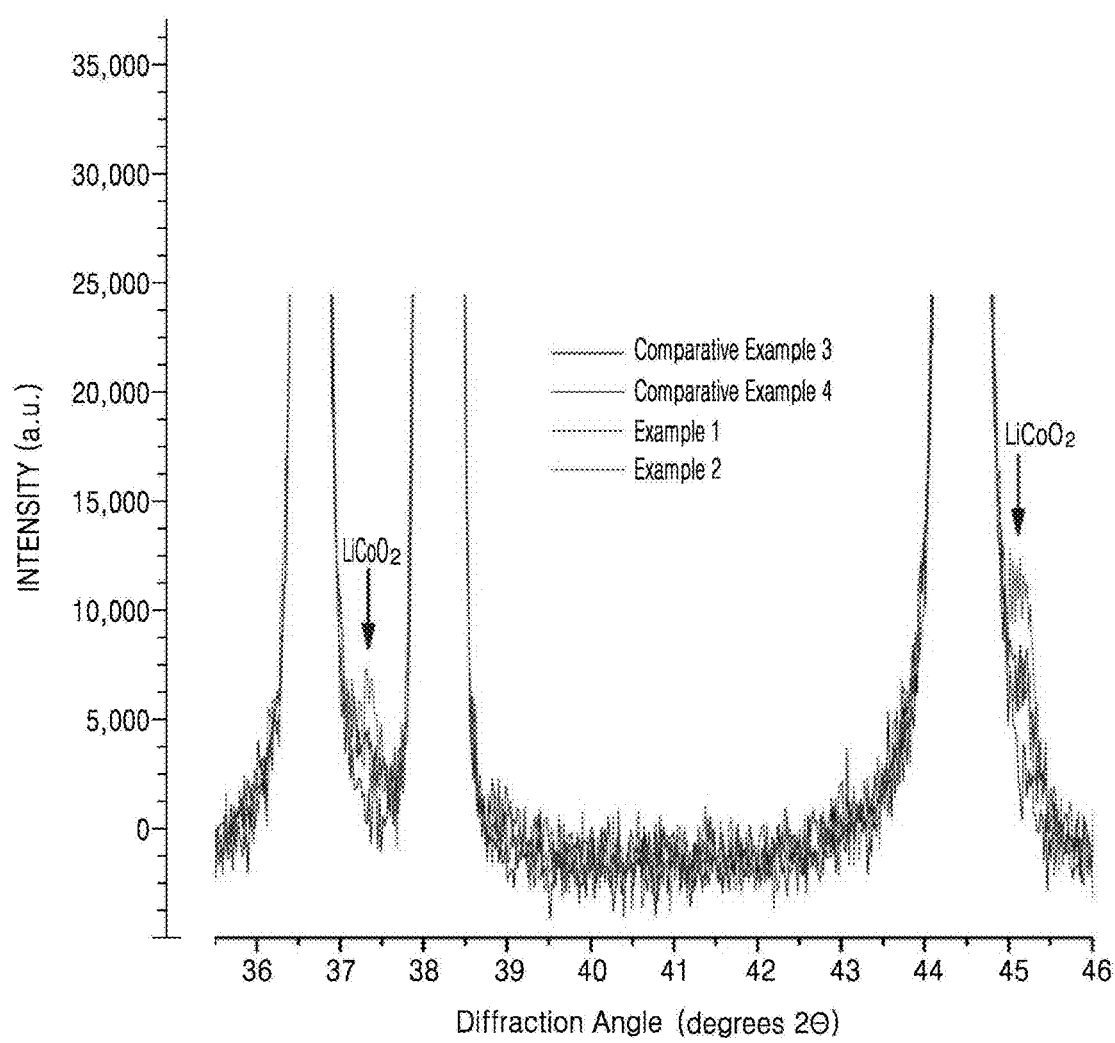
FIG. 2B shows an enlarged view of a portion of FIG. 2A.

XRD spectra of the composite cathode active materials of Examples 1 to 2 and Comparative Examples 3 to 4 were measured. Results thereof are shown in FIGS. 2A and 2B. XRD spectra was measured by Cu Kα radiation.

Referring to FIG. 2A, the XRD spectrum of the composite cathode active material of Comparative Example 3 including a coating layer containing the Co-containing composition shows only a peak corresponding a phase having a layered crystal structure belonging to a space group R-3m. Accordingly, it was confirmed that the Co-containing composition included in the coating layer has a layered crystal structure belonging to a space group R-3m.

Referring to FIG. 2A, the XRD spectra of composite cathode active materials of Comparative Example 4 in which the coating layer includes the Ce-containing composition alone and Examples 1 and 2 in which the coating layer includes the Ce-containing composition and the Co-containing composition show, in addition to the peak corresponding to the layered crystal structure, a peak at the diffraction angle (2θ) of 27° to 30°, a peak at the diffraction angle (2θ) of 32° to 35°, a peak at the diffraction angle (2θ) of 46° to 48°, and a peak at the diffraction angle (2θ) of 56° to 58°. Accordingly, it was confirmed that a second phase structurally distinct from the first phase included in the Co-containing composition was additionally formed. From the additional peaks of FIG. 2A, it was confirmed that the Ce-containing composition included in the coating layer had the second phase having a fluorite crystal structure belonging to an Fm-3m space group.

Though Rietveld refinement analysis, it was confirmed that the Co-containing composition had $LiCoO_2$ phase, $Co_3O_4$ phase, and the Ce-containing composition had the $CeO_2$ phase.

Referring to FIG. 2B, which is a partial enlarged view of FIG. 2A, it was confirmed that the composite cathode active materials of Comparative Example 3 and Examples 1 to 2, in which the coating layer had the Co-containing composition, additionally had a peak corresponding to the $LiCoO_2$ phase. Therefore, it was confirmed that the coating layer has $LiCoO_2$ phase. The composite cathode active material of Comparative Example 4 did not have the peak corresponding to the $LiCoO_2$ phase.

Evaluation Example 2: Evaluation of Composition of Surface and Inside of Core FIGS. 3A to 3E show scanning electron microscope (SEM) images of the surfaces of the composite cathode active material of Comparative Examples 1, 3, and 4 and Examples 1 and 2. Surface composition was analyzed by energy dispersive X-ray spectroscopy ("EDS").

Figure 3A:
FIGS. 3A to 3E show scanning electron microscope ("SEM") images of the surfaces of the composite cathode active materials of Comparative Examples 1, 3, and 4 and Examples 1 and 2.

As shown in FIG. 3A, it was confirmed that residual lithium was present on the surface of the composite cathode active material of Comparative Example 1.

Figure 3B:
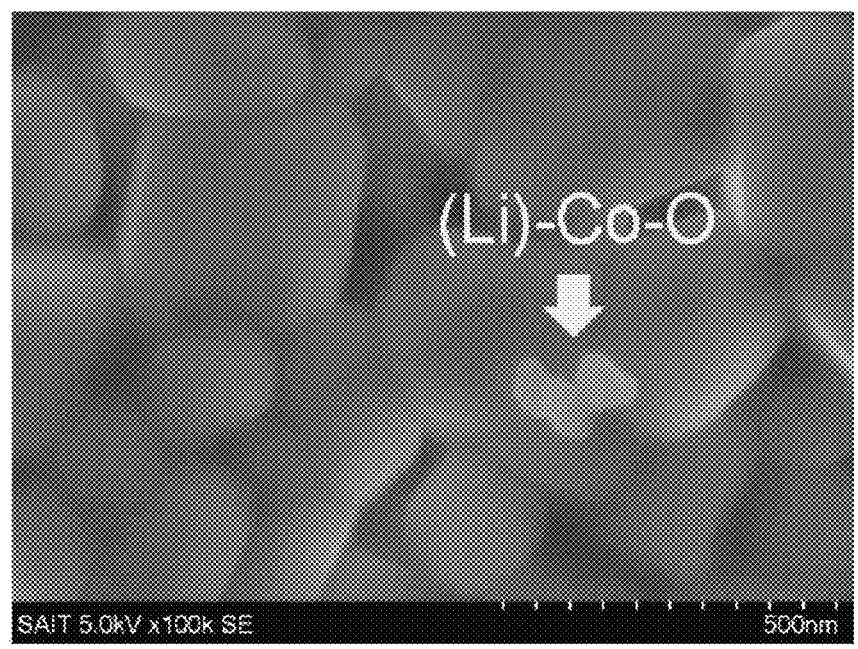

As shown in FIG. 3B, it was confirmed that a Co-containing coating layer having a Li—Co—O composition was formed on the surface of the composite cathode active material of Comparative Example 3 coated with a Co-containing composition.

Figure 3C:
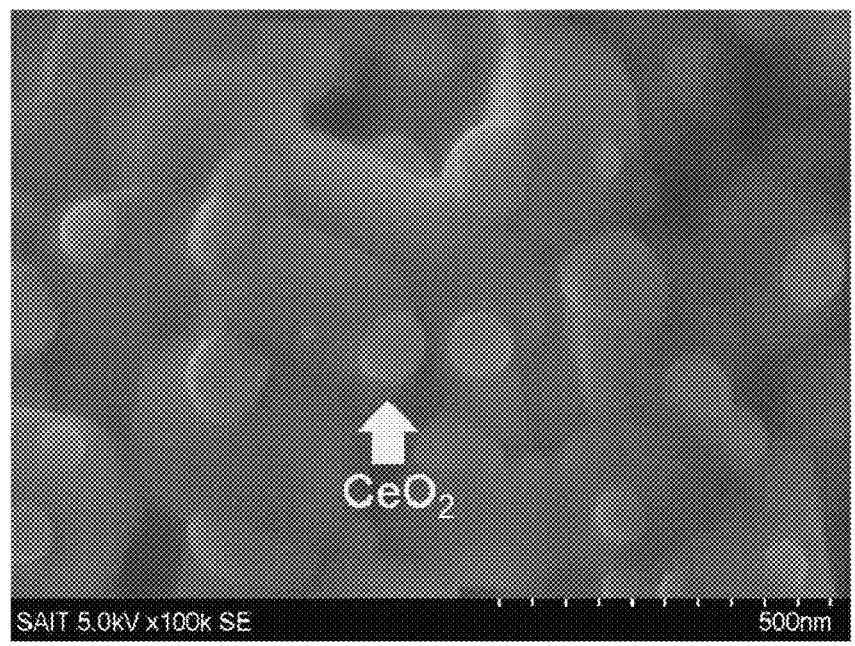

As shown in FIG. 3C, it was confirmed that the composite cathode active material of Comparative Example 3 coated with a Ce-containing composition had a Ce-containing coating layer having a $CeO_2$ composition at a surface thereof.

Figure 3D:
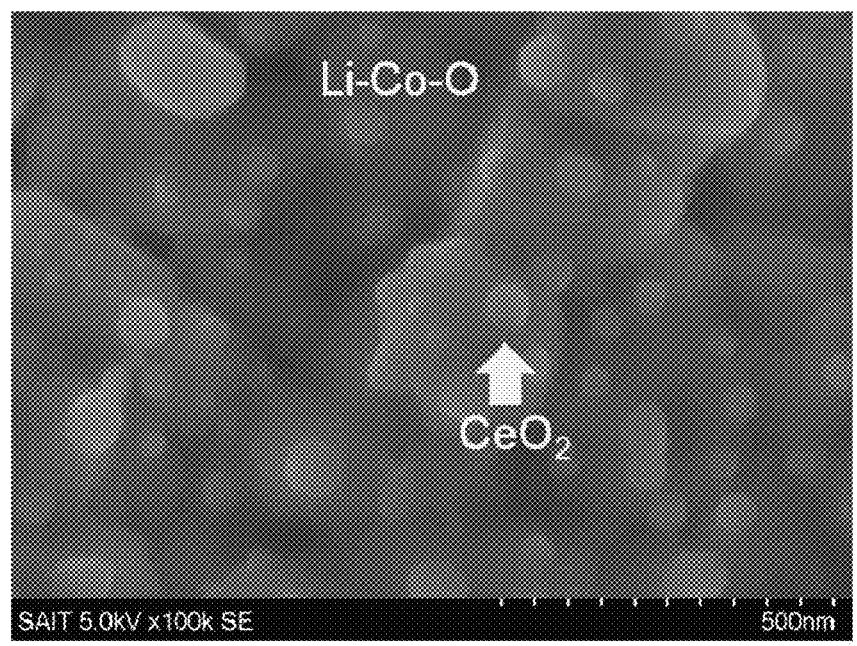
Figure 3E:
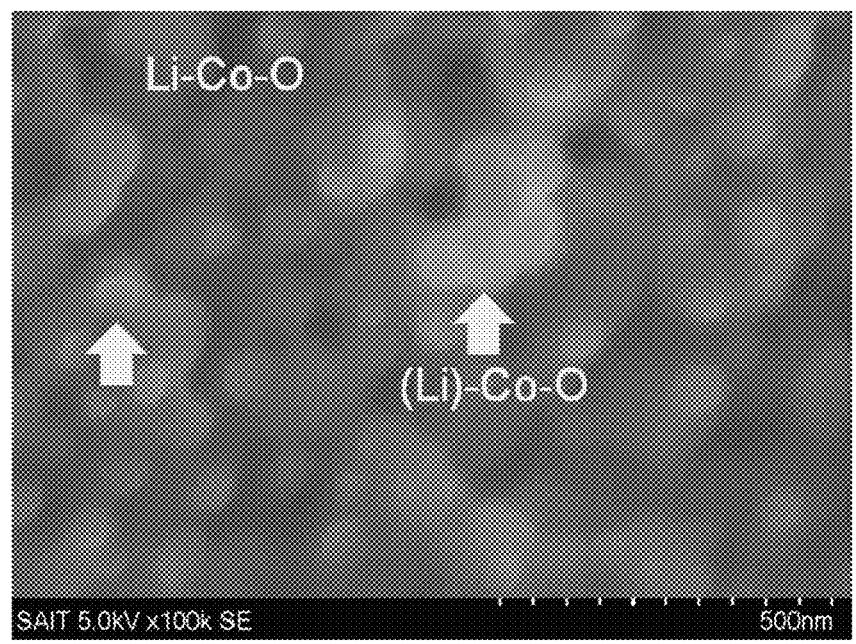

As shown in FIGS. 3D and 3E, it was confirmed that each of the composite cathode active materials of Examples 1 and 2 had a Co-containing coating layer having a Li—Co—O composition and a Ce-containing coating layer having $CeO_2$ composition at a surface thereof.

FIGS. 4A to 4C show a high-angle annular dark field ("HAADF") scanning transmission electron microscope ("STEM") image and EDS images of the cross section of the composite cathode active material including a plurality of primary particles aggregated into a secondary particle, which corresponds to a core, formed by aggregating primary particles and a coating layer on the core of Example 1.

As shown in FIG. 4C, it was confirmed that the first layer containing Co was formed on the core and the primary particles included in the core. Although not shown in the drawing, it was confirmed that a second layer containing Ce was additionally disposed on the coating layer containing Co.

In addition, referring to FIG. 4C, it was confirmed that the Co concentration in first layer was greater than the Co concentration in primary particles. In FIGS. 4B and 4C, the higher the concentration of the metal, the brighter the color corresponding to the metal. That is, it was confirmed that a high concentration Co-containing coating layer was formed on the primary particles included in the core. As shown in FIG. 4C, the thickness of the first layer was about 20 nanometers (nm).

Although not shown in the figure, through additional high resolution analysis, it was confirmed that there exists a grain boundary between primary particles included in the core and a separate phase containing Zr on the core surface. The separate phase was a $Li_2ZrO_3$ phase with a monoclinic crystal structure belonging to the C2/m space group.

Although not shown in the figure, it was confirmed that the composite cathode active material of Example 3 was formed in the form of a single layer of a composite coating layer containing Co and Ce simultaneously on the surface of the core.

Evaluation Example 3: Evaluation of Residual Lithium Content

An amount of the surface residual lithium of each of the composite cathode active materials of Examples 1 to 2 and Comparative Example 1 was measured, and some of the results are shown in Table 1 below.

An amount of the surface residual lithium was evaluated by measuring the Li content in $Li_2CO_3$ and LiOH remained on the surface of composite cathode active material by a wet method (or titration method).

For a specific measurement method, refer to the method disclosed in paragraph [0054] of Japanese Patent Laid-Open Publication No. 2016-081903.

TABLE 1

|  | Residual lithium content (parts per million (ppm)) |
| --- | --- |
| Comparative Example 1 | 4514 |
| Example 1 | 1123 |
| Example 2 | 1432 |

As shown in Table 1, it was confirmed that the residual lithium content of each of the composite cathode active materials of Examples 1 and 2 was smaller than the residual lithium content of the composite cathode active material of Comparative Example 1.

It was assumed that the residual lithium on the surface of the lithium nickel transition metal oxide was sequentially reacted with the precursor of the first composition and the precursor of the second composition to form a multilayer coating layer on the core.

Therefore, a lithium battery including the second composite cathode active material of Example 1, compared with a lithium battery including the composite cathode active material of Comparative Example 1, suppresses gas generation during charging and discharging and suppresses a side reaction with the electrolytic solution, leading to improved lifetime characteristics.

Evaluation Example 4: Differential Scanning Calorimetry (DSC) Measurement of Composite Cathode Active Material Regarding the composite cathode active materials of Example 1 and Comparative Examples 3 and 4, a DSC thermogram was measured at the temperature from 30° C. to 350° C., and the results are shown in Table 2 below.

TABLE 2

|  | Caloric value (joules per gram (J/g)) |
| --- | --- |
| Example 1 | 1485 |
| Comparative Example 1 | 1583 |
| Comparative Example 4 | 1708 |

As shown in Table 2, the composite cathode active material of Example 1 including the first and second compositions has a lower caloric value than each of the composite cathode active materials of Comparative Example 3 and 4 including the first composition or the second composition.

Therefore, it was confirmed that the composite cathode active material of Example 1 had improved thermal stability compared to the composite cathode active materials of Comparative Example 3 and 4.

Evaluation Example 5: Evaluation of High Temperature Stability of Composite Cathode Active Material Lithium batteries (Open Circuit Voltage ("OCV"), 4.35 V) of Example 10 and Comparative Examples 11 and 13 were charged at a current of 0.1 C at a temperature of 45° C. to a voltage of 100% of a state of charge ("SOC"). After cut-off, the charged lithium batteries were stored in an oven at 60° C. for 7 days, and then subjected to a high-temperature stability evaluation by measuring the concentration of metal ions eluted in an electrolytic solution.

TABLE 3

|  | Elution amount (ppm) | | | |
| --- | --- | --- | --- | --- |
|  | Mn | Co | Ni | Ce |
| Comparative Example 11 (Co 0.75 wt %, a single layer) | 2.0 | 6.7 | 74 | 0 |
| Comparative Example 13 (Ce 0.29 wt %, single layer) | 0.9 | 2.0 | 45 | 0 |
| Example 10 (Co 0.5 wt % + Ce 1.5 wt %, two layers, $Li_2ZrO_3$ grain boundary coating) | 0.7 | 2.8 | 29 | 0 |

As shown in Table 3, metal ion leakage in the lithium battery of Example 10 was inhibited compared to the lithium batteries of Comparative Examples 11 and 13.

It can be seen that the inhibition of metal ion leakage was due to the stabilized coating layer that was caused by the inclusion of the second layer in the composite cathode active material in Example 10, while the composite cathode active materials of Comparative Examples 11 and 13 did not include the second layer.

For example, it can be seen that because the second layer acts as a protective layer, which is considered to be the leakage of metal ions was more effectively suppressed at high temperatures.

Evaluation Example 6: Evaluation of Charging and Discharging Characteristics at Room Temperature The lithium batteries of Examples 5 to 8 and Comparative Examples 5 to 8 were subjected to constant-current charging at a current of 0.1 C rate at a temperature of 25° C. until the voltage reached 4.35 volts (V) (vs. $Li/Li^+$), and then maintained at 4.35 V in the constant voltage mode and cut off at a current of 0.05 C rate. Then, discharging was performed thereon at a constant current of 0.1 C rate until the voltage reached 2.8 V (vs. $Li/Li^+$) ($1^{st}$ cycle, formation cycle).

A lithium battery that had undergone the $1^{st}$ cycle was constant-current charged at a temperature of 25° C. at a current of 0.5 C rate until the voltage reached 4.35 V (vs. $Li/Li^+$), followed by a cut-off at a current of 0.05 C rate while maintaining a constant voltage of 4.35 V. Then, discharging was performed thereon at a constant current of 0.2 C rate until the voltage reached 2.8 V (vs. $Li/Li^+$) ($2^{nd}$ cycle).

A lithium battery that had undergone the $2^{nd}$ cycle was constant-current charged at a temperature of 25° C. at a current of 1 C rate until the voltage reached 4.35 V (vs. $Li/Li^+$), followed by a cut-off at a current of 0.05 C rate while maintaining a constant voltage of 4.35 V. Then, during discharging, the lithium battery was discharged at a constant current of 1 C rate until the voltage reached 2.8 V (vs. $Li/Li^+$) ($3^{rd}$ cycle), and this cycle was repeated (repeated 50 times) under the same conditions until the $52^{th}$ cycle.

There was a stopping time of 10 minutes after one charge/discharge cycle in all charge/discharge cycles.

Some of the charge-discharge test results are shown in Table 3 below. The capacity retention in the $52^{th}$ cycle is defined by Equation 1 below.

The discharge capacity in the $2^{nd}$ cycle was taken as the standard capacity.

$$\text{Capacity retention (\%)} = (\text{Discharge capacity in } 52^{th} \text{ cycle}/\text{Discharge capacity in } 3^{rd} \text{ cycle}) \times 100\% \quad \text{Equation 1}$$

TABLE 4

| | 2nd cycle discharge capacity (standard capacity) (milliampere hours per gram (mAh/g) | capacity retention (%) |
|---|---|---|
| Comparative Example 6 (Core + washing) | 213 | 92.7 |
| Comparative Example 7 (Co 0.75 wt %, single layer) | 223 | 91.9 |
| Comparative Example 8 (Ce 1.5 wt %, single layer) | 213 | 93.9 |
| Example 5 (Co 0.5 wt % + Ce 1.5 wt %, two layers, $Li_2ZrO_3$ grain boundary coating) | 220 | 94.5 |
| Example 6 (Co 0.75 wt % + Ce 1.5 wt %, two layers, $Li_2ZrO_3$ grain boundary coating) | 225 | 94.2 |
| Example 7 (Co 0.5 wt % + Ce 1.5 wt %, a single composite layer, $Li_2ZrO_3$ grain boundary coating) | 220 | 94.3 |
| Example 8 (Co 0.5 wt %, Ce 1.5 wt %, two layers, $Li_2ZrO_3$ grain boundary-uncoated) | 218 | 93.8 |

As shown in Table 4, the lithium batteries of Examples 5 to 8 had improved life characteristics without decreasing the actual capacity as compared with the lithium battery of Comparative Example 6.

Such improved lifetime characteristics were attributed to the fact that the surface of the composite cathode active material was further stabilized by the multilayer coating or the multilayer composite coating in the composite cathode active material included in each of the lithium batteries of Examples 5, 6, and 8, which had lead to suppression of the side reaction with an electrolytic solution.

In addition, the composite cathode active material included in each of the lithium batteries of Examples 5 and 6 has a second layer which was not included in the composite cathode active material included in each of the lithium batteries of Comparative Example 7 and Comparative Example 8, and thus the second layer effectively suppress the side reaction of the reaction mixture. For example, Ce or the like in the second layer disposed on the first layer of the composite cathode material contained in each of the lithium batteries of Examples 5 to 8 was inhibited from intermixing with the transition metals contained in the primary particles. Therefore, the leakage of the nickel ions contained in the composite cathode active material into the electrolytic solution is effectively suppressed. In addition, the interface resistance between the composite cathode active material and the electrolytic solution is reduced because the Ce oxide contained in the second layer has ion conductivity and electron conductivity at the same time. In addition, since the Ce oxide contained in the second layer has excellent structural thermal stability, the surface of the composite cathode active material is stabilized by suppressing the side reaction with the electrolytic solution.

In addition, the lithium battery of Example 5 has improved life characteristics compared to the lithium battery of Example 8. Such improved lifetime characteristics are considered due to the fact that, for example, in the composite cathode active material included in the lithium battery of Example 5, $Li_2ZrO_3$ is in the grain boundary between the primary particles inside the core, in addition to the surface of the core, and due to this coating, the side reaction of primary particles inside the core and an electrolyte and the leakage of transition metal from primary particles are suppressed, and a three-dimensional lithium ion transfer path is obtained by the second phase on the surface of the core surface and inside the core.

Evaluation Example 7: Evaluation of High Temperature Charging and Discharging Characteristics The lithium batteries of Example 10 and Comparative Examples 11 to 13 were subjected to constant-current charging at a current of 0.1 C rate at a temperature of 45° C. until the voltage reached 4.30 V (vs. Li/Li$^+$), and then maintained at 4.35 V in the constant voltage mode and cut off at a current of 0.05 C rate. Then, discharging was performed thereon at a constant current of 0.1 C rate until the voltage reached 2.8 V (vs. Li/Li$^+$) (1$^{st}$ cycle, formation cycle).

A lithium battery that had undergone the 1$^{st}$ cycle was constant-current charged at a temperature of 45° C. at a current of 1 C rate until the voltage reached 4.30 V (vs. Li/Li$^+$), followed by a cut-off at a current of 0.05 C rate while maintaining a constant voltage of 4.30 V. Then, discharging was performed thereon at a constant current of 0.2 C rate until the voltage reached 2.8 V (vs. Li/Li$^+$) (2$^{nd}$ cycle).

A lithium battery that had undergone the 2$^{nd}$ cycle was constant-current charged at a temperature of 45° C. at a current of 1 C rate until the voltage reached 4.30 V (vs. Li/Li$^+$), followed by a cut-off at a current of 0.05 C rate while maintaining a constant voltage of 4.30 V. Then, during discharging, the lithium battery was discharged at a constant current of 1 C rate until the voltage reached 2.8 V (vs. Li/Li$^+$) (3$^{rd}$ cycle), and this cycle was repeated (repeated 100 times) under the same conditions until the 102$^{nd}$ cycle.

There was a stopping time of 10 minutes after one charge/discharge cycle in all charge/discharge cycles.

Some of the charge-discharge test results are shown in Table 4 below. The capacity retention in the 102$^{nd}$ cycle is defined by Equation 2 below.

Capacity retention (%)=(Discharge capacity at 102$^{nd}$ cycle/Discharge capacity at 3$^{rd}$ cycle)×100%   Equation 2

TABLE 5

| | Capacity retention (%) |
|---|---|
| Comparative Example 11 (Co 0.75 wt %, a single layer) | 90.8 |
| Comparative Example 13 (Ce 0.29 wt %, single layer) | 81.1 |
| Example 10 (Co 0.5 wt % + Ce 1.5 wt %, two layers, $Li_2ZrO_3$ grain boundary coating) | 93.1 |

As shown in Table 5, the lithium battery of Example 10 had improved high-temperature lifetime characteristics compared to the lithium batteries of Comparative Examples 11 and 13. In other words, the lithium battery of Example 10 has better thermal stability than the lithium batteries of Comparative Examples 11 and 13.

The improved high-temperature lifetime characteristics were due to the stabilization in the coating layer that is caused by the inclusion of the second layer in the composite cathode active material in Example 10, while the composite cathode active materials of Comparative Examples 11 and 13 did not include the second layer.

For example, the second layer acts as a protective layer, which is considered to be a more effective suppression of, for example, metal ion leakage at high temperatures.

Evaluation Example 8: Evaluation of Charging and Discharging Characteristics at Room Temperature (LFP 5% Addition Evaluation)

The lithium batteries of Examples 5 and 9 were subjected to constant-current charging at a current of 0.1 C rate at a temperature of 25° C. until the voltage reached 4.35 V (vs. Li/Li$^+$), and then maintained at 4.35 V in the constant voltage mode and cut off at a current of 0.05 C rate. Then, discharging was performed thereon at a constant current of 0.1 C rate until the voltage reached 2.8 V (vs. Li/Li$^+$) (1$^{st}$ cycle, formation cycle).

A lithium battery that had undergone the 1$^{st}$ cycle was constant-current charged at a temperature of 25° C. at a current of 0.5 C rate until the voltage reached 4.35 V (vs. Li/Li$^+$), followed by a cut-off at a current of 0.05 C rate while maintaining a constant voltage of 4.35 V. Then, discharging was performed thereon at a constant current of 0.2 C rate until the voltage reached 2.8 V (vs. Li/Li$^+$) (2$^{nd}$ cycle).

A lithium battery that had undergone the 2$^{nd}$ cycle was constant-current charged at a temperature of 25° C. at a current of 1 C rate until the voltage reached 4.35 V (vs. Li/Li$^+$), followed by a cut-off at a current of 0.05 C rate while maintaining a constant voltage of 4.35 V. Then, during discharging, the lithium battery was discharged at a constant current of 0.2 C rate until the voltage reached 2.8 V (vs. Li/Li$^+$) (3$^{rd}$ cycle), and this cycle was repeated (repeated 50 times) under the same conditions until the 52$^{th}$ cycle.

There was a stopping time of 10 minutes after one charge/discharge cycle in all charge/discharge cycles.

Some of the charge-discharge test results are shown in Table 6 below. The capacity retention in the 52$^{th}$ cycle, and the initial charge-discharge efficiency in the 1$^{st}$ cycle and the high-rate characteristic are defined by Equations 3 and 4 below.

The discharge capacity in the 2$^{nd}$ cycle was taken as the standard capacity.

Capacity retention (%)=(Discharge capacity at 52$^{th}$ cycle/Discharge capacity at 3$^{rd}$ cycle)×100%    Equation 3

Initial efficiency (%)=(Discharge capacity in 1$^{st}$ cycle/charging capacity in 1$^{st}$ cycle)×100    Equation 4

TABLE 6

| | 1$^{st}$ cycle discharge capacity (mAh/g) | Initial efficiency (%) | Standard capacity (mAh/g) | Capacity retention (%) |
|---|---|---|---|---|
| Example 5 | 225 | 92.6 | 220 | 94.5 |
| Example 9 | 225 | 93.2 | 220 | 95.6 |

As shown in Table 6, the lithium battery of Example 9 including LiFePO$_4$ had improved initial charge-discharge efficiency and capacity retention as compared with the lithium battery of Example 5.

Evaluation Example 9: Evaluation of DC Resistance ("DC-IR") at Room Temperature (25° C.)

The initial DC-IR of the lithium batteries of Example 5 and Example 9 was measured at room temperature (25° C.) by using the following method.

In the 1$^{st}$ cycle, lithium batteries were charged at the current of 0.5 C to the voltage of state of charge ("SOC") 50%, and then cut-off at 0.02 C, followed by 10 minutes of stopping, and the lithium batteries were constant-current discharged at 0.5 C for 30 seconds, followed by 30 seconds of stopping, and then constant-current charged at 0.5 C for 30 seconds, followed by 10 minutes of stopping, and the lithium batteries were constant-current discharged at 1 C for 30 seconds, followed by 30 seconds of stopping, and then constant-current charged at 0.5 C for 1 minute, followed by 10 minutes of stopping, and the lithium batteries were constant-current discharged at 2 C for 30 seconds, followed by 30 seconds of stopping, and then constant-current charged at 0.5 C for 2 minutes, followed by 10 minutes of stopping, and the lithium batteries were constant-current discharged at 3 C for 30 seconds, followed by 30 seconds of stopping, and then constant-current charged at 0.5 C for 3 minutes, followed by 10 minutes of stopping.

The average voltage drop value for each C-rate for 30 seconds is the DC voltage value. The direct current ("DC") resistance at the measured DC voltage was calculated and is shown in Table 6 below.

TABLE 7

| | Initial DC resistance (milliohms (mΩ)) |
|---|---|
| Example 5 | 125 |
| Example 9 | 121 |

As shown in Table 7, the lithium battery of Example 9 including LiFePO$_4$ had reduced initial DC resistance as compared with the lithium battery of Example 5.

Evaluation Example 10: Evaluation of High-Temperature Charging and Discharging Characteristics (LFP 5% Addition Evaluation)

The lithium batteries of Examples 10 and 14 were subjected to constant-current charging at a current of 0.1 C rate at a temperature of 45° C. until the voltage reached 4.30 V (vs. Li/Li$^+$), and then maintained at 4.30 V in the constant voltage mode and cut off at a current of 0.05 C rate. Then, discharging was performed thereon at a constant current of 0.1 C rate until the voltage reached 2.8 V (vs. Li/Li$^+$) (1$^{st}$ cycle, formation cycle).

A lithium battery that had undergone the 1$^{st}$ cycle was constant-current charged at a temperature of 45° C. at a current of 0.5 C rate until the voltage reached 4.30 V (vs. Li/Li$^+$), followed by a cut-off at a current of 0.05 C rate while maintaining a constant voltage of 4.30 V. Then, discharging was performed thereon at a constant current of 0.2 C rate until the voltage reached 2.8 V (vs. Li/Li$^+$) (2$^{nd}$ cycle).

A lithium battery that had undergone the 2$^{nd}$ cycle was constant-current charged at a temperature of 45° C. at a current of 1 C rate until the voltage reached 4.30 V (vs. Li/Li$^+$), followed by a cut-off at a current of 0.05 C rate while maintaining a constant voltage of 4.30 V. Then, during discharging, the lithium battery was discharged at a constant current of 1 C rate until the voltage reached 2.8 V (vs. Li/Li$^+$) (3$^{rd}$ cycle), and this cycle was repeated (repeated 100 times) under the same conditions until the 102$^{nd}$ cycle.

There was a stopping time of 10 minutes after one charge/discharge cycle in all charge/discharge cycles.

Some of the charge-discharge test results are shown in Table 7 below. The capacity retention in the 102$^{nd}$ cycle is defined by Equation 5 below.

Capacity retention (%)=(Discharge capacity at 102$^{nd}$ cycle/Discharge capacity at 3$^{rd}$ cycle)×100%  Equation 5

TABLE 8

| | capacity retention (%) |
|---|---|
| Example 10 | 93.1 |
| Example 14 | 93.6 |

As shown in Table 8, the lithium battery of Example 14 including LiFePO$_4$ had improved high-temperature lifetime characteristics as compared with the lithium battery of Example 10.

In one aspect, the composite cathode active material includes a multi-layer or single-layer composite coating layer including a first metal and a second metal to improve the cyclic characteristics and thermal stability of a lithium battery.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite cathode active material for an organic electrolyte or solid electrolyte lithium battery comprising:
    a core comprising a plurality of primary particles; and
    a shell disposed on the core,
    wherein
        a primary particle of the plurality of primary particles includes a lithium nickel transition metal oxide, and
    the shell includes a first composition and a second composition, wherein the first composition contains a first metal and the second composition contains a second metal, wherein
        the first metal comprises nickel and cobalt,
        the second metal comprises cerium, and
    the first composition comprises a first phase and the second composition comprises a second phase that is distinguishable from the first phase,
    wherein the first composition comprises a phase having a layered crystal structure and a phase having a spinel crystal structure,
    wherein the core comprises a grain boundary between primary particles of the plurality of primary particles, and the grain boundary comprises Zr,
    wherein the grain boundary comprises a third composition comprising a third phase having a monoclinic crystal structure, and the structure of the third composition belongs to a C2/m, C12/c1, or C2/c space group, wherein the lithium nickel transition metal oxide is represented by Formula 4:

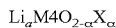   Formula 4 wherein in Formula 4,
0.9≤a≤1.2 and 0≤α<2,
M4 comprises nickel, a fourth metal, and a fifth metal, wherein the fourth metal is an element of Groups 2 to 13 of the Periodic Table and is different from nickel and the fifth metal,
X is F, S, or P, and
the amount of nickel in M4 is about 70 mole percent to less than about 100 mole percent, based on a total content of the lithium nickel transition metal oxide.

2. The composite cathode active material of claim 1, wherein the layered crystal structure belongs to a space group R-3m, and
    wherein the spinel crystal structure belongs to a space group Fd-3m.

3. The composite cathode active material of claim 1, wherein the second composition comprises a phase having a fluorite crystal structure.

4. The composite cathode active material of claim 3, wherein the fluorite crystal structure belongs to a space group Fm-3m.

5. The composite cathode active material of claim 1, wherein the shell comprises:
    a multi-layered structure comprising a first layer and a second layer, wherein the first layer includes a first composition, the second layer includes a second composition, and the second layer is located on the first layer.

6. The composite cathode active material of claim 5, wherein a primary particle comprises the first layer on a surface of the primary particle, and
    wherein a concentration of the first metal in the first layer is greater than a concentration of the first metal in the primary particle.

7. The composite cathode active material of claim 1, wherein the first composition comprises the first metal and oxygen, or a composition comprising lithium, the first metal, and oxygen,
    wherein
        an amount of the lithium is 0 moles to about 3.3 moles of lithium, based on 1 mole of the first composition,
        an amount of the first metal is about 0.7 moles to about 3.3 moles of the first metal, based on 1 mole of the first composition, and
        an amount of the oxygen is about 1.7 moles to about 4.3 moles of oxygen, based on 1 mole of the first composition.

8. The composite cathode active material of claim 1, wherein the shell comprises Co$_3$O$_4$.

9. The composite cathode active material of claim 1, wherein an amount of the first composition or the first metal included in the shell is 10 parts by weight or less, based on 100 parts by weight of the lithium nickel transition metal oxide.

10. The composite cathode active material of claim 1, wherein the second composition is a composition comprising the second metal and oxygen, wherein
    an amount of the second metal is about 0.7 moles to about 1.3 moles, based on 1 mole of the second composition, and
    an amount of the oxygen is about 1.7 moles to about 2.3 moles, based on 1 mole of the second composition.

11. The composite cathode active material of claim 1, wherein the second composition is represented by Formula 2:

$$M2_bO_c \qquad \text{Formula 2}$$

wherein in Formula 2,
M2 is Ce, and
0.9≤b≤1.1 and 1.9≤c≤2.1.

12. The composite cathode active material of claim 1, wherein the second composition comprises $CeO_2$.

13. The composite cathode active material of claim 1, wherein an amount of the second composition or second metal included in the shell is 10 parts by weight or less, based on 100 parts by weight of the lithium nickel transition metal oxide.

14. The composite cathode active material of claim 1, wherein the grain boundary comprises a third composition comprising lithium, Zr, and oxygen, and
an amount of the lithium is about 1.7 moles to about 2.3 moles, based on 1 mole of the third composition,
an amount of Zr is about 0.7 moles to about 1.3 moles, based on 1 mole of the third composition, and
an amount of the oxygen is about 2.7 moles to about 3.3 moles, based on 1 mole of the third composition.

15. The composite cathode active material of claim 1, wherein the grain boundary comprises a third composition represented by Formula 3:

$$Li_aM3_bO_c \qquad \text{Formula 3}$$

wherein in Formula 3,
M3 is Zr, and
1.9≤a≤2.1, 0.9≤b≤1.1, and 2.9≤c≤3.1.

16. The composite cathode active material of claim 1, wherein the shell further includes a fifth composition including a fifth metal.

17. The composite cathode active material of claim 1, wherein
an amount of the nickel is about 0.7 moles to about 0.99 moles, based on 1 mole of the lithium nickel transition metal oxide,
an amount of the fourth metal is about 0.01 moles to about 0.3 moles, based on 1 mole of the lithium nickel transition metal oxide, and
an amount of the fifth metal is about 0.0005 moles to about 0.01 moles, based on 1 mole of the lithium nickel transition metal oxide.

18. The composite cathode active material of claim 1, wherein the lithium nickel transition metal oxide is represented by Formula 5:

$$Li_aNi_bM5_cM6_dM7_eO_{2-\alpha}X_\alpha \qquad \text{Formula 5}$$

wherein in Formula 5,
0.9≤a≤1.2, 0.7≤b≤1, 0≤c≤0.3, 0≤d≤0.3, 0≤e≤0.1, b+c+d+e=1, and 0≤α<2,
M5, M6, and M7 are different from each other, and are each Co, Mn, Zr, Al, Re, V, Cr, Fe, B, Ru, Ti, Nb, Mo, Mg, or Pt, and
X is F, S, or P.

19. The composite cathode active material of claim 1, wherein the lithium nickel transition metal oxide is represented by Formula 6 or Formula 7:

$$Li_aNi_bCo_cMn_dM8_eO_{2-\alpha}X_\alpha \qquad \text{Formula 6}$$

$$Li_aNi_bCo_cAl_dM8_eO_{2-\alpha}X_\alpha \qquad \text{Formula 7}$$

wherein in Formulae 6 and 7,
0.9≤a≤1.2, 0.7<b<1, 0<c<0.1, 0<d<0.1, 0≤e<0.01, b+c+d+e=1, and 0≤α<2, M8 is Zr, Al, V, Cr, Fe, Re, B, Ru, Ti, Nb, Mo, Mg, or Pt, and
X is F, S, or P.

20. The composite cathode active material of claim 1, wherein the lithium nickel transition metal oxide is represented by Formula 8:

$$aLi_2MnO_3\cdot(1-a)LiMO_{2-\alpha}X_\alpha \qquad \text{Formula 8}$$

wherein in Formula 8,
0<a<1 and 0≤α<2,
M comprises
Ni and
Co, Mn, Zr, Al, Re, V, Cr, Fe, B, Ru, Ti, Nb, Mo, Mg, Pt, or a combination thereof, and
X is F, S, or P.

21. A cathode comprising the composite cathode active material of claim 1.

22. The cathode of claim 21, further comprising a cathode active material having an olivine structure.

23. The cathode of claim 21, wherein an amount of the cathode active material having an olivine structure is less than or equal to about 10 weight percent, based on a total weight of the cathode active material.

24. A lithium battery comprising:
the cathode of claim 21;
an anode; and
an organic electrolyte or solid electrolyte between the cathode and the anode.

25. A method of manufacturing the composite cathode active material of claim 1, the method comprising:
providing the lithium nickel transition metal oxide;
contacting a first metal precursor, a second metal precursor, and the lithium nickel transition metal oxide to prepare a mixture;
drying the mixture; and
heat-treating the dried mixture in an oxidizing atmosphere at a temperature of 400° C. to 1000° C. to manufacture the composite cathode active material.

26. The method of claim 25, wherein the providing of the lithium nickel transition metal oxide comprises:
contacting a precursor of the lithium nickel transition metal oxide and a Zr precursor to prepare a mixture; and
heat-treating the mixture in an oxidizing atmosphere at a temperature of 400° C. to 1,000° C. to provide the lithium nickel transition metal oxide.

27. The composite cathode active material of claim 1, wherein the shell comprises a single layer, wherein the single layer comprises the first composition and the second composition.

28. The composite cathode active material of claim 27, wherein a primary particle comprises the single layer on a surface of the primary particle, and
wherein a concentration of the first metal in the single layer is greater than a concentration of the first metal in the primary particle.

29. The composite cathode active material of claim 1, wherein the core has an average grain boundary length of about 50 nm to about 1000 nm and an average grain boundary thickness of about 1 nm to about 200 nm, wherein a length direction of the grain boundary is a direction that is parallel to a surface of the primary particles adjacent thereto, and a thickness direction of the grain boundary is a direction that is perpendicular to the surface of the primary particles adjacent thereto, wherein the average grain boundary length is an average value of lengths of grain boundaries arranged in a first direction, and the average grain boundary thickness is an average value of thicknesses of grain boundaries arranged in a second direction.

* * * * *